United States Patent Office 3,435,075
Patented Mar. 25, 1969

3,435,075
PROCESS FOR PREPARING (HALOPHENYL) ALKYL KETONE COMPOUNDS
Edward J. Glamkowski, Plainfield, and Meyer Sletzinger, North Plainfield, N.J., assignors to Merck & Co., Inc., Rahway, N.J., a corporation of New Jersey
No Drawing. Filed June 15, 1965, Ser. No. 464,227
Int. Cl. C07c 49/76, 45/00
U.S. Cl. 260—590
1 Claim

ABSTRACT OF THE DISCLOSURE

Invention relates to a process for preparing (halophenyl) alkyl ketone compounds which comprises reaction of a benzene compound with an alkanoyl halid to form a phenyl ketone compound and then converting the latter compound to a (halophenyl) alkyl ketone. The (halophenyl) alkyl ketone compounds are useful in the preparation of α-alkyl-(halophenyl) acetic acid compounds which latter compounds are anti-inflammatory agents.

---

This invention relates to processes for preparing α-lower alkyl-(3-halo-4-cyclohexylphenyl) acetic acid compounds. Another aspect of this invention is the preparation of (3-halo-4-cyclohexylphenyl) lower alkyl ketone from which the above acids may be made. More particularly, this invention relates to processes for the preparation of α-methyl-(3-chloro-4-cyclohexylphenyl) acetic acid and 3-chloro-4-cyclohexylacetophenone.

The development of antiinflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

The acetic acid compounds prepared by the processes of this invention are antiinflammatory agents. These compounds have a high degree of antiinflammatory activity and are effective in the prevention and inhibition of granuloma tissue formation. Certain of them possess this activity in high degree and are of value in the treatment of arthritic and dermatological disorders and in like conditions which are responsive to treatment with antiinflammatory agents. In addition, the compounds prepared by this invention have a useful degree of antipyretic and analgesic activity and also indicate some fatty acid synthesis inhibition. For these purposes, they are normally administered orally in tablets or capsules. Oral dose levels in the range of 1.0-2,000 mg. per day are useful in control of arthritic conditions.

Since the phenylacetic acid compounds prepared by this invention possess asymmetric carbon atoms, they are ordinarily present in the form of a racemic mixture. The resolution of such racemates can be carried out by a vast number of known methods. Thus, some racemic mixtures can be precipitated as eutectics instead of mixed crystals and can thus be quickly separated and in such cases can sometimes be selectively precipitated. The more common method of chemical resolution may be used. By this method diastereomers are formed from the racemic mixture by reaction with an optically-active resolving agent. Thus, an optically-active base can be reacted with the carboxyl group. The difference in solubility between the diastereomers formed permits the selective crystallization of one form and regeneration of the optically-active acid from the mixture. There is, however, a third method of resolving which shows great promise. This is one or the other forms of biochemical procedures using selective enzymatic reaction. Thus, the racemic acid can be subjected to an asymmetric oxidase or decarboxylase which will, by oxidation or decarboxylation, destroy one form, leaving the other form unchanged. Even more attractive is the use of a hydrolysase on a derivative of the racemic mixture to form preferentially one form of the acid. Thus, esters or amides of the acids can be subjected to an esterase which will selectively saponify one enantiomorph and leave the other unchanged.

Furthermore, the above resolution methods may be employed at any stage of the synthesis upon such intermediates that have an asymmetric carbon atom. Particularly, the resolution may be carried out with intermediates of the following general formula:

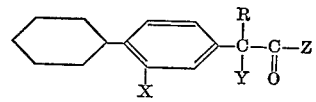

wherein X is halogen, R is lower alkyl, Z is hydroxy or amino and Y is hydroxy, lower alkoxy, ar-lower alkoxy, chloro, bromo, amino or $SO_2R_1$ wherein $R_1$ is lower alkyl or phenyl. Any of the above compounds may be first resolved to the optically-active compound, followed by reduction (i.e., with Raney nickel or Pd). For example, when Y is OH or $NH_2$, the compound can be resolved (i.e., when Y is OH) using an optically-active acid to make a diastereoisomeric mixture of esters, or where Y is $NH_2$, use of an optically-active acid to make a diastereoisomeric mixture of salts, which can be separated and the free (d) alcohol or amine liberated. Alternatively, use can be made of the Z=OH portion using optically-active bases; this procedure can be used to resolve all the other compounds of the above group. When Y is all but $SO_2R_1$, the (d) isomer is reduced to the (d) final acid or the corresponding (d) amide. In the case of $SO_2R_1$, the (l) isomer is reduced which results in an inversion to the (d) final acid or corresponding amide. For example, this reduction may be carried on the above optically-active compound in the presence of an excess of Raney nickel in refluxing ethanol for a period of 4 hours. When the amide compound is used, the final (d) acid compound may be obtained by any hydrolysis method for conversion of an amide to its corresponding acid.

When the free acid is resolved into (d) and (l) enantiomorphs, the antiinflammatory activity is found to reside virtually completely in the (d) isomer. The desired (d) isomer of the free acid may be prepared by any one of the preceding described resolving methods, preferably working from the free acid as the starting material. For example, amide or salt disastereomers of the free acid may be formed with optically-active amines, such as quinine, brucine, cinchonidine, cinchonine, hydroxyhydrindamine, menthylamine, morphine, α-phenylethylamine, phenyloxynaphthylmethylamine, quinidine, 1-fenchylamine, strychnine, basic amino acids, such as lysine, arginine, amino acid esters, and the like. Similarly, ester diastereomers of the free acid may be formed with optically-active alcohols, such as borneol, menthol, 2-octanol and the like. Especially preferred is the use of cinchonidine to give the readily decomposable diastereomer salt which may then be resolved by dissolving in a solvent, such as acetone, and distilling the solvent at atmospheric pressure until crystals begin to appear and further crystallization produced by allowing the mixture to cool to room temperature, thereby separating the two enantiomorphs. The (d) acid may then be recovered from the (d) salt by extracting the salt between an inorganic solvent, such as petroleum ether and dilute hydrochloric acid.

As previously indicated, one aspect of this invention is the process for the preparation of (3-halo-4-cyclohexylphenyl) lower alkyl ketones, and more particularly, 3-chloro-4-cyclohexylacetophenone. The preparation of aromatic halogenated acetophenone type compounds (ketone) from benzene has in the past been accomplished by reaction of benzene with an alkanoyl halide (Friedel Crafts reaction) using an aluminum halide, isolation of the ketone and direct halogenation of the ketone. This latter reaction led to side chain halogenation. Subsequently, it was found that after preparation of the ketone, aromatic halogenation could be accomplished when the latter compound was reacted in a molten state (without a solvent) with a halogen in the presence of an excess of an aluminum halide.

We have found that the halogenated aromatic carbonyl compound can be prepared by, first, the Friedel Crafts acylation of the aromatic nucleus, and second, halogenation in the same reaction media. We have found that the halogenation can be accomplished in a solvent, particularly the solvent used for the Friedel-Crafts reaction, without first isolating the aromatic ketone. The ability to use a solvent imparts several advantages to the preparation of the halo acetophenone type compound, namely, (1) the use of a solvent allows the halogenation to proceed at room temperature and below; the ability to use temperature below room temperature allows for more selective halogenation and at low temperatures with an excess of halogen, dihalogenation is reduced to a minimum; stirring becomes easier and gas absorption is more efficient, (2) the use of a solvent allows the acylation and subsequent halogenation to proceed in the same reaction medium without isolation of the acylated benzene compound and (3) since the halogenation may be carried out without first isolating the acylated product, less aluminum halide is needed in this step.

This process is applicable to aromatic compounds (i.e., benzene, lower alkylbenzene and cycloalkylbenzene) in which the cycloalkyl group has 3 to 8 carbons and particularly to cyclohexylbenzene from which is prepared 3-chloro-4-cyclohexylacetophenone.

The process may be described as follows:

PROCESS A

Preparation of a p-cyclohexylphenyl ketone

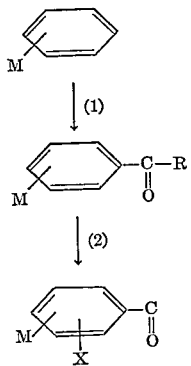

Equivalents: wherein R is lower alkyl (methyl, ethyl, butyl and the like), X is halogen (chloro and bromo) preferably methyl and chloro, and M is hydrogen, lower alkyl, or cycloalkyl of 3 to 8 carbons.

To a mixture of an aluminum halide in an inert solvent, maintained at low temperatures, is added a lower alkanoyl halide or anhydride. To this mixture is then added cyclohexylbenzene. After the acylation is complete, an additional amount of aluminum halide is added, whereupon a halogen gas is bubbled through the mixture. When this nuclear halogenation is substantially complete, the reaction mixture is mixed with water or an aqueous mineral acid to form the desired (3-halo-4-cyclohexylphenyl) ketone. The aluminum halide used may be $AlCl_3$ or $AlBr_3$, but preferably $AlCl_3$. The acylating agent may be an acetyl halide, propionyl halide or the respective anhydrides and the like, but preferably acetyl chloride. The temperature during the acylation reaction is maintained at or below ambient temperature, but preferably 0°–(−25°) C. and especially −10°–(−20°) C. Any suitable inert solvent may be used for this acylation, such as hydrocarbons and halohydrocarbons (i.e., methylene dichloride, hexane, cyclohexane and the like), but it is preferred to use methylene dichloride. The molar ratio of aluminum halide to acylating agent and cyclohexylbenzene is not critical; varying the ratios will only effect the yield ultimately obtained. Although the sequence of addition previously described is preferred, one may employ any sequence of addition of the acylating agent, cyclohexylbenzene and aluminum halide. The nuclear halogenation may be carried out at any desired temperature, for example, −30° C. to reflux temperature of the solvent, (preferably −20° to +15° C.), but it is preferred to carry out this step at ambient temperatures. The halogenating agent may be chlorine or bromine, but preferably chlorine. The amount of aluminum halide needed at this point depends upon the amount added at the acylating stage. To obtain nuclear halogenation without any appreciable side chain halogenation, the side chain must be complexed with the aluminum halide and, in addition, at least a slight excess of aluminum halide to activate the halogen. Therefore, at the halogenation stage all that is required is a slight amount of free aluminum halide. If this is present from the acylation stage, no additional amount is required. However, it is preferred to have at least one molar excess of free aluminum halide for substantial nuclear halogenation. After halogenation, the resulting product is in the form of a complex. The complex is broken and the desired ketone is obtained by mixing the reaction mixture with either water or an aqueous acid. It is preferred that an aqueous acid be used, preferably an aqueous mineral acid and especially diulte hydrochloric acid.

Another method old in the art for preparing the (3-halo-4-cyclohexylphenyl) ketone compound is to first halogenate the cyclohexylbenzene in an inert solvent, separate the cyclohexylhalobenzene isomers obtained and a Friedel Crafts acylation of the isolated 2-cyclohexylhalobenzene. This method may be used to prepare all of the halogen substituted compounds (chloro, bromo, iodo and fluoro). For example, cyclohexylbenzene is brominated or chlorinated in the presence of anhydrous aluminum chloride. The iodo group is added by reaction with iodine and nitric acid and the fluoro substituent is prepared by nitrating the cyclohexylbenzene conversion to the corresponding diazonium compound and subsequent reaction of this compound with hydrofluoroboric acid.

For the sake of simplicity, the second aspect of our invention, namely, the processes for the preparation of the α-lower alkyl-(3-halo-4-cyclohexylphenyl) acetic acid compounds will be discussed in two parts. The first discussion will concern itself with the variety of methods to produce the intermediates, followed by a discussion of the preparation of the final α-lower alkyl acetic acids from each of the intermediates.

PREPARATION OF INTERMEDIATE I

α-Lower alkyl-(3-halo-4-cyclohexylphenyl) acetonitrile

This intermediate may be prepared by several procedures. In one procedure the (3-halo-4-cyclohexylphenyl) ketone (prepared as previously described) may be reduced to the corresponding alcohol, halogenation of the alcohol to the corresponding halide and reaction of the halide with a cyanide to form the Intermediate I. Another procedure is to react the previously prepared 2-cyclohexylhalobenzene in a hydrohalogen acid and para-formaldehyde to form the (3-halo-4-cyclohexyl) benzyl halide; this compound is then converted to the corresponding α-unsubstituted nitrile by reaction with a cyanide. The Intermediate I compound is then formed by α-alkylation of this nitrile. Still another method of preparing the Intermediate I is by a Friedel Crafts type reaction with 2-cyclohexylhalobenzene, wherein the latter compound is reacted, in the presence of an aluminum halide, with an α-halo lower alkyl nitrile to form directly the Intermediate I.

The above reactions are illustrated in Flow Sheet B, and the reactions and conditions that follow further describe our invention.

PROCESS B

Preparation of α-lower alkyl-(3-halo-4-cyclohexylphenyl) acetonitrile

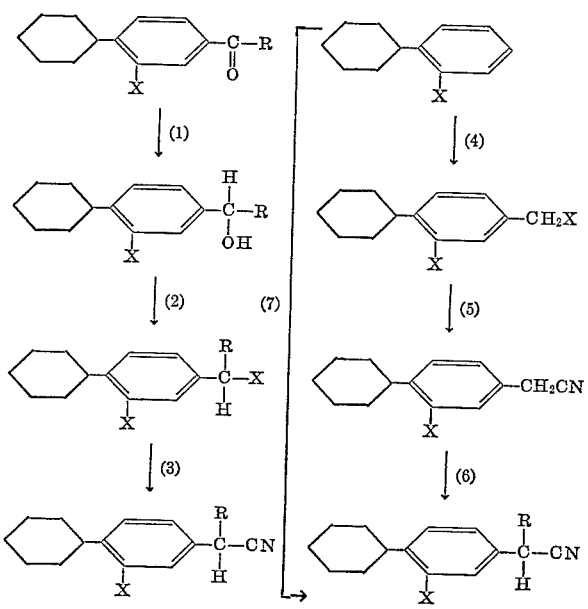

Equivalents: wherein R is lower alkyl (methyl, ethyl, butyl and the like) and X is halogen (chloro, bromo, fluoro and iodo).

REACTIONS AND CONDITIONS

Step 1.—Reduction of the carbonyl by any of the well-known methods employed in the art; such as catalytic reduction with palladium, platinum, nickel and the like, under an atmosphere of hydrogen, or chemical reduction, such as with inorganic hydrides [i.e., with alkali borohydrides ($NaBH_4$, $KBH_4$), $LiAlH_4$ and the like]. It is preferred to carry out this reduction with an alkali borohydride, especially $NaBH_4$, in a solvent, such as alcohols (methanol, ethanol, butanol and the like) at any suitable temperature (0° C.—reflux), preferably ambient temperatures, until the reaction is substantially complete.

Step 2.—Displacement of the hydroxyl by a halide by any of the well-known methods in the art; for example, reaction with a hydrohalogen acid, a phosphorus halide or thionyl chloride (such as hydrochloric acid, hydrobromic acid, phosphorus trichloride, phosphorus pentachloride, phosphorus tribromide and the like) or conversion to the mesylate or tosylate. The reaction is preferably carried out in an inert solvent (i.e., benzene, toluene, xylene and the like) with HBr at any suitable temperature (0° C. room temperature), but especially in benzene at below room temperature, until the reaction is substantially complete. Alternatively, 3-halo-4-cyclohexylbenzene may be reacted with acetaldehyde and HCl in the presence of $AlCl_3$ to form the product of Step 2.

Step 3.—Displacement of the halide with a cyanide by any of the well-known methods of the art; such as reaction with an inorganic cyanide (i.e., NaCN, KCN and the like) in an inert solvent, such as dimethylsulfoxide (DMSO), dimethoxyfuran, water-alcohol and the like; preferably reaction in (DSMO), with KCN at any suitable temperature (0° C. reflux), but especially at or near 60° C. until the reaction is substantially complete.

Step 4.—Friedel Crafts type reaction, using formaldehyde and a hydrohalogen acid with or without a condensing agent, and by other variations well-known in the art. For example, reaction with formaldehyde, methylal or a halomethylether with a zinc halide or aluminum halide with or without an inert solvent (such as carbondisulfide). The reaction is preferably carried out by heating paraformaldehyde, hydrogen chloride and the cyclohexylbenzene compound at elevated temperatures (50°–75° C.) until the reaction is substantially complete.

Step 5.—Same as Step 3.

Step 6.—Alkylation by any method well known in the art, such as reaction with an alkyl halide (i.e., methyl bromide, ethyl chloride, propyl bromide and the like) in an inert solvent (i.e., benzene, ether and the like) in the presence of sodamide, sodium hydride, lithium N,N-dialkylamide and the like, at any suitable temperature (−80° C. reflux) until the reaction is substantially complete. Preferably reaction with methyl bromide in ether in the presence of sodamide at or near the reflux temperature of the system until the reaction is substantially complete.

Step 7.—Reaction by any of the well-known methods of the art; i.e., Friedel-Crafts type alkylation, such as reaction with a mixture of a halo lower alkyl nitrile (α-chloropropionitrile, α-bromobutyronitrile and the like) with or without an inert solvent (such as hydrocarbons, halohydrocarbons and the like) in the presence of an aluminum halide at any suitable temperature (−20° C. to +50° C.) until the reaction is substantially complete. Preferably, reaction with α-chloropropionitrile in ethylene dichloride in the presence of aluminum chloride at temperatures below room temperature (i.e., −15° C. to −10° C.) until the reaction is substantially complete. Alternatively, the reaction may be carried out using an α-hydroxy lower alkanoic acid ester, such as ethyl α-hydroxy propionate, propyl α-hydroxy butyrate and the like, in place of the α-halo lower alkyl nitrile. When this is done, the corresponding ester of the final compound is obtained which may then be saponified or hydrolyzed to the acid by any known method for hydrolysis or saponification of an ester.

PREPARATION OF INTERMEDIATE II

α-Lower alkyl-α-(3-halo-4-cyclohexylphenyl) acetaldehyde compounds

This intermediate may also be prepared from a variety of procedures. In one procedure the 3-halo-4-cyclohexylphenyl ketone compound, prepared as previously described, undergoes the well-known Darzens condensation with subsequent decarboxylation to the Intermediate II. Another procedure is a Friedel Crafts type alkylation of a m-halobromobenzene with cyclohexane to form a 3-halo-4-cyclohexylbromobenzene compound, subsequent formation of the corresponding Grignard compound, followed by a standard Grignard reaction with a halo ketone to form a halo substituted alcohol compound. This latter compound is then cyclized to form an oxide, which compound is then cleaved to form the Intermediate II. Alternatively, the above substituted halo-alcohol compound may be prepared by reacting a 3-halo-4-cyclohexylacetophenone, obtained as previously described, with a hypohalite to form the corresponding phenacyl halide, which compound undergoes a Grignard type reaction with a lower alkly magnesium halide to form the halo substituted alcohol. The phenacyl halide may also be prepared by a Friedel Crafts type reaction using a cyclohexylhalobenzene and a haloacetyl halide.

Still another procedure for the preparation of the Intermediate II is the reaction of a 3-halo-4-cyclohexylphenyl ketone with a methoxy alkylidinetriphenylphosphorane to form an enol ether and subsequent hydrolysis to the Intermediate II.

These reactions are illustrated in Flow Sheet C, and the reactions and conditions that follow further describe our invention.

PROCESS C

Preparation of α-lower alkyl-α-(3-halo-4-cyclohexylphenyl) acetaldehyde compounds

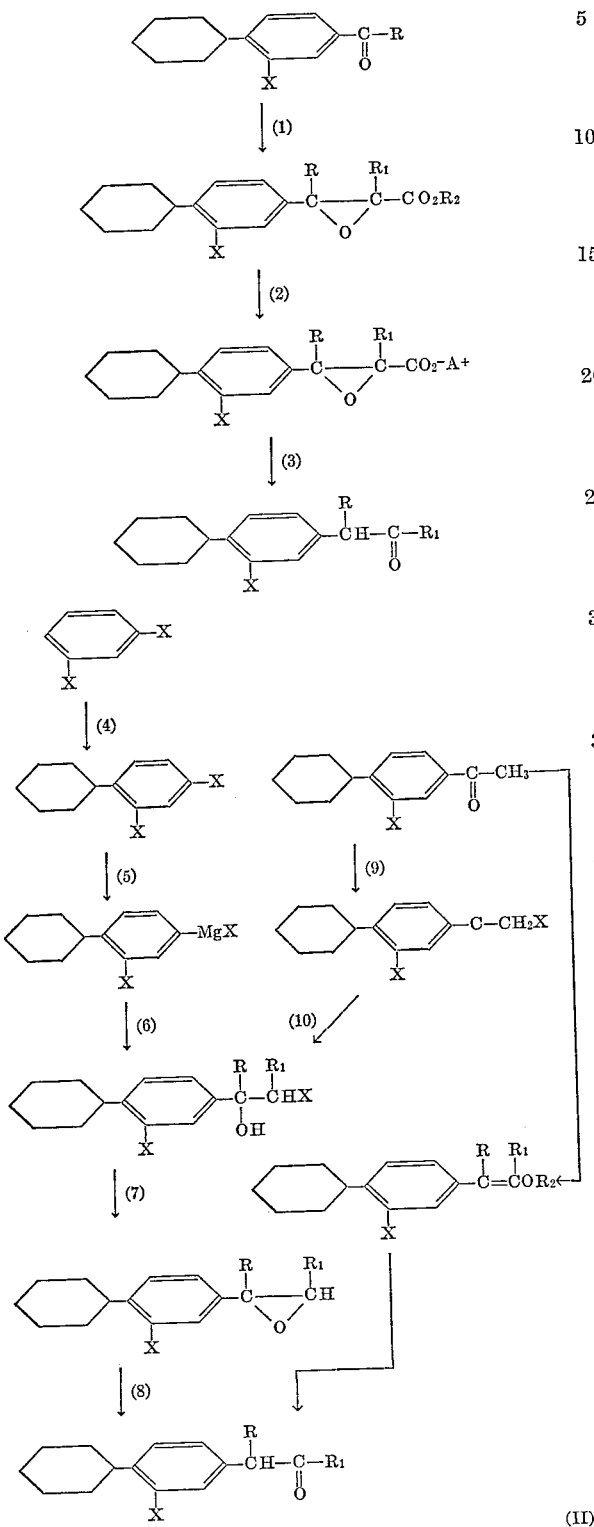

Equivalents: X and R are same as Process B; $R_1$ is hydrogen or lower alkyl (methyl, propyl, pentyl and the like) preferably methyl; $R_2$ is any ether forming group, such as alkyl, ar-alkyl and the like; $A^+$ is a cation.

REACTIONS AND CONDITIONS

Steps 1, 2 and 3 may be carried out by the well-known Darzens type condensation.

Step 1.—This step is the condensation of the ketone with an ester of an α-halo acetic or propionic acid (such as ethyl chloroacetate, methyl bromopropionate and the like) to form a glycidic ester (preferably ethyl chloroacetate).

Step 2.—This step may be carried out by any well-known saponification procedure of the ester to form the salt (i.e., reaction with sodium hydroxide or alkoxide in an alcohol).

Step 3.—This step may be carried out by any well-known decarboxylation procedure of a glycidic acid (i.e., the compound may be heated in an acid solution to decarboxylate the compound). These reactions may be varied by any of the known Darzens synthesis variations (i.e., the glycidic ester may be heated directly in an acid solution to hydrolyze the ester and simultaneously decarboxylate the acid produced).

Step 4.—This step may be carried out by the well-known Friedel Crafts type reaction using cyclohexanol (or one of its reactive esters, as, for example, cyclohexanol, tosylate, mesylate, etc.), cyclohexene or a cyclohexyl halide (preferably cyclohexene) in the presence of an acid catalyst (i.e., aluminum chloride, sulfuric acid and the like. The preferred conditions for this reaction are those similarly described in Process B, Step 7.

Step 5.—This step may be carried out by any of the well-known methods for preparing Grignard reagents. It is preferred, however, in this step to use the 3-chloro-4-cyclohexylbromobenzene. Utilizing this compound and employing ether as the solvent, the organo-metallic bond can easily be obtained at the bromo position rather than at the chloro position.

Step 6.—This step may be carried out by a standard Grignard reaction with a compound of the formula

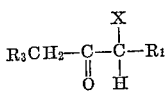

wherein $R_3$ may be hydrogen or lower alkyl, X is halogen, and $R_1$ may be hydrogen or lower alkyl, preferably the reaction is carried out using the compound wherein $R_3$ is hydrogen, with subsequent hydrolysis to cleave the magnesium salt.

Step 7.—This reaction may be carried out by any well-known cyclodehydrohalogenation procedure to obtain the epoxy compound. Any base catalyzed cyclodehydrohalogenation procedure may be used, i.e., reaction with an alkali hydroxide or alkali alkoxide, preferably an alkali alkoxide (NaOH) in an inert solvent (methanol, ethanol) at elevated temperatures, but especially at or near the reflux of the system, until the reaction is substantially complete.

Step 8.—Reaction by any well-known acid catalyzed epoxide ring cleavage procedure to form the corresponding carbonyl compound, such as reaction with a mineral acid; preferably aqueous hydrochloric acid at elevated temperatures, in a bomb above 150° C. until the reaction is substantially complete.

Step 9.—Monohalogenation of the methyl ketone by any well-known method in the art (i.e., monohalogenation with an acid catalyst or reaction with an alkyl hypohalite in an inert solvent such as $CCl_4$, preferably ethyl hyprochlorite at low temperatures (−20° to 25° C.) until the reaction is substantially complete). The product of Step 9 may be prepared by reaction of a 2-cyclohexylhalobenzene with a haloacetyl halide (Friedel Crafts type reaction).

Step 10.—Grignard reaction (same as Step 6 above) using an alkyl magnesium halide, preferably methyl magnesium bromide.

Step 11.—Conversion of the carbon to oxygen bond to an olefin by any known method of the art (i.e., a Wittig type reaction) for example, reaction with a methoxyalkylidenetriphenyl - phosphorane, preferably methoxymethylenetriphenylphosphorane, in an inert solvent (DMSO, diglyme, ether), preferably ether, at any desired temperature (0° C. reflux), preferably at ambient temperatures, until the reaction is substantially complete.

Step 12.—Reaction by any well-known method for the hydrolysis of an enol ether (i.e., acid hydrolysis, such as p-toluenesulfonic acid, sulfosalicylic acid, preferably with perchloric acid) at any desired temperature (−10° to 100° C.), preferably 20° to 30° C., until the reaction is substantially complete.

PREPARATION OF INTERMEDIATE III 3-halo-4-cyclohexylphenylacetic acid

This intermediate may be prepared by several procedures. In one procedure a Grignard reagent is prepared from a 3-halo-4-cyclohexylbenzyl halide compound. The Grignard reagent is then carbonated to form the Intermediate III. In another procedure the 3-halo-4-cyclohexylbenzyl halide undergoes a displacement reaction wherein the cyanide group replaces the halo group on the methyl side chain to form the corresponding acetonitrile compound. This compound may then be hydrolyzed to form the Intermediate III. In still another procedure a 3-halo-4-cyclohevylacetophenone compound undergoes the Willgerodt reaction to form the Intermediate III.

The above reactions are illustrated in Flow Sheet D and the reactions and conditions that follow further describe our invention.

PROCESS D 3-halo-4-cyclohexylphenylacetic acid

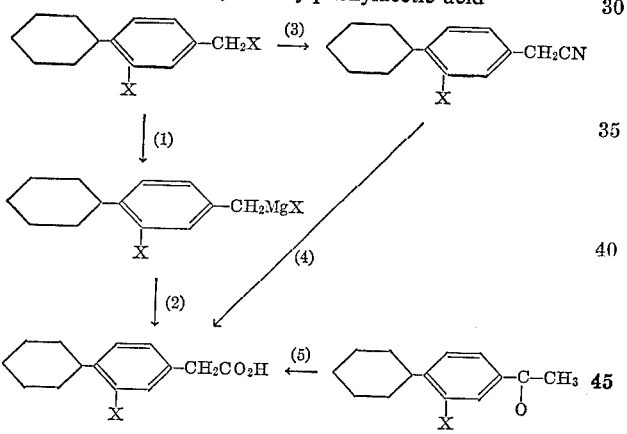

Equivalents: X is the same as Process A.

REACTIONS AND CONDITIONS

Step 1.—Preparation of the corresponding Grignard reagent by methods well-known in the art.

Step 2.—Carbonation of the Grignard reagent by any of the well-known methods, i.e., using solid or gaseous carbon dioxide, preferably addition of gaseous carbon dioxide, through an inert solvent containing the Grignard reagent and subsequent reaction with an acid.

Step 3.—Same as Step 3, Process B.

Step 4.—Hydrolysis of the nitrile by any of the variety of the methods well-known to the art (i.e., acid or basic hydrolysis, preferably acid hydrolysis with a mineral acid, such as aqueous hydrochloric acid, sulfuric acid and the like).

Step 5.—Reaction by the well-known Willgerodt type reaction (i.e., reaction with sulfur and morpholine).

PREPARATION OF INTERMEDIATE IV

α-Lower alkyl-α-(3-halo-4-cyclohexylphenyl) malonic acid

This intermediate may be prepared by esterification of the acetic acid compound (Intermediate III), condensation of the ester thus obtained with a dialkyl carbonate to form the malonic ester, alkylation of the malonic ester and subsequent hydrolysis to the free acid.

This process is illustrated in Flow Sheet E. The reactions and conditions that follow further describe our invention.

PROCESS E

α-Lower alkyl-α-(3-halo-4-cyclohexylphenyl) malonic acid

III

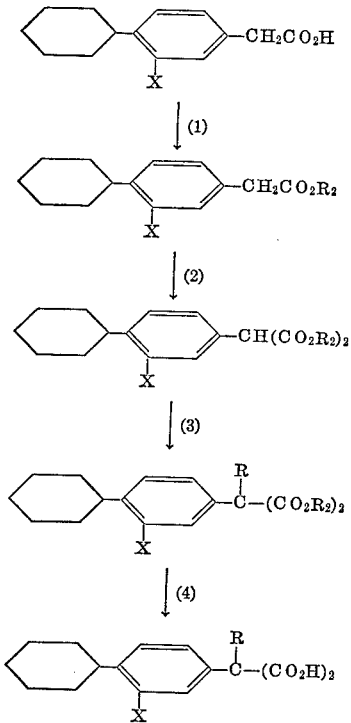

Equivalents: X and R are same as Process A; $R_2$ is lower alkyl or any other de-esterifiable group.

REACTIONS AND CONDITIONS

Step 1.—Esterification by any known method in the art.

Step 2.—Base catalyzed condensation to form malonic esters by procedures well-known in the art (i.e., reaction with a lower dialkyl carbonate (diethyl carbonate, dipropyl carbonate, ethylpropyl carbonate and the like)) in the presence of an alkali alkoxide (sodium methoxide, potassium methoxide, sodium propoxide and the like).

Step 3.—Alkylation of a malonate ester by any well-known procedures in the art. For example, alkylation with an alkyl halide (methyl iodide, ethyl bromide, propyl iodide and the like) in the presence of a strong base (such as an alkali alkoxide; sodium ethoxide, potassium propoxide and the like).

Step 4.—Hydrolysis of malonate ester by any of the well-known methods in the art (i.e., basic hydrolysis to the dialkali salt and subsequent acidification to the malonic acid derivative). Hydrolysis may also be carried out under acid conditions to the malonic acid directly.

PREPARATION OF INTERMEDIATE V

α-Hydroxy- (or α-alkoxy-) α-lower alkyl-3-halo-4-cyclohexylphenylacetic acid

This intermediate may be prepared by several procedures. In one procedure a 2-cyclohexylhalobenzene undergoes the Friedel Crafts reaction with an oxalic acid half ester halide or with its mixed anhydride to form a glyoxalate compound. This compound is then reacted with an alkyl magnesium halide (Grignard reaction) to form the corresponding α-alkyl-α-hydroxy ester and subsequent hydrolysis of this ester forms the Intermediate V. Alternatively, the α-alkyl-α-hydroxy ester may be prepared by reacting a 3-halo-4-cyclohexylphenyl magnesium halide (Grignard reagent) with an α-keto ester. Another procedure for the preparation of the Intermediate V is the reaction of a 3-halo-4-cyclohexylphenyl ketone compound with a haloform in a basic aqueous or alcoholic solution, followed by acidification to give the Intermediate V.

These reactions are illustrated in Flow Sheet F, and the reactions and conditions that follow further describe our invention.

PROCESS F

α-Hydroxy- (or α-alkoxy-) α-lower alkyl-α-3-halo-4-cyclohexylphenylacetic acid

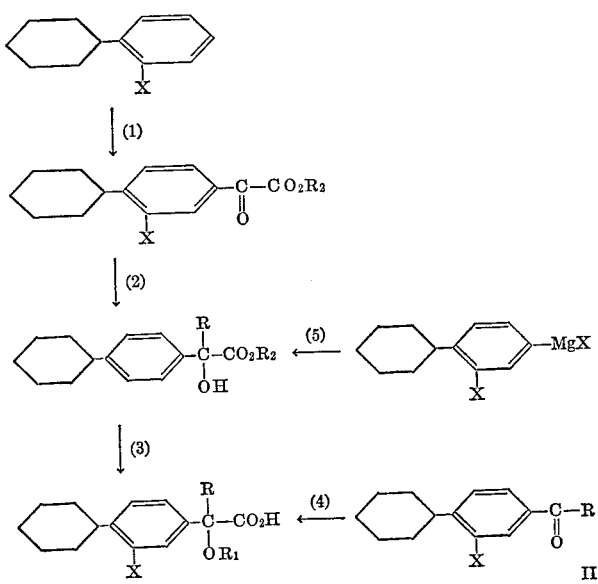

Equivalents: X and R are same as Process A; $R_1$ is hydrogen or lower alkyl; $R_2$ is lower alkyl or any group which may be de-esterified.

REACTIONS AND CONDITIONS

Step 1.—Friedel Crafts type acylation employing an oxalic acid half ester halide; the reaction is preferably carried out using 2-mole equivalents of $AlCl_3$ in an inert solvent with ethyloxalyl chloride.

Step 2.—Reaction of the carbonyl group with organo-magnesium or organo-lithiumm compounds, preferably the well-known Grignard reaction using methyl-magnesium bromide, and subsequent decomposition with water and/or aqueous dilute acids.

Step 3.—Hydrolysis of the ester by any means well-known in the art.

Step 4.—Reaction with a haloform, preferably chloroform, and an aqueous alkali hydroxide (or if the alkoxy compound is desired, using an alcoholic alkali hydroxide). The reaction may be carried out with or without a solvent, generally the alcohol or aqueous solution is used as a solvent also. The reaction temperature may vary from 20° to 100° C., but it is preferred to carry out the reaction between 25° to 50° C. The reaction product is acidified with any suitable acid (i.e., carboxylic acid, mineral acid and the like), preferably with $H_2SO_4$. Alternatively, reaction with hydrogen cyanide or cyanide salt, preferably hydrogen cyanide, and subsequent hydrolysis will produce the product of Step 4.

Step 5.—Reaction with an α-keto ester, preferably ethyl pyruvate, under any of the well-known Grignard condensation type reaction conditions.

Some of the intermediate compounds mentioned on column 2, wherein the formula was shown as

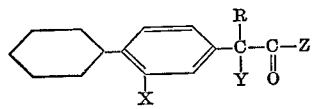

have been prepared by the previous process steps (Process F); the others may be prepared as follows: when Y is hydroxy and Z is $NH_2$ (hydroxyamide), a typical reaction is as follows: a 3-halo-4-cyclohexylacetophenone is reacted with hydrogen cyanide in ether containing piperidine catalyst. The resulting cyanohydrin is then hydrolyzed to the hydroxyamide by fortified hydrochloric acid at 0° C.

When Y is lower alkoxy and Z is $NH_2$, the alkoxy acid previously prepared (Process F) can undergo an amidification of the carboxylic acid moiety by methods well-known to the art.

When Y is chloro and Z is hydroxy, said compound is prepared by replacement of the hydroxyl group of the corresponding hydroxy acid (Process F) using thionyl chloride with or without a solvent (i.e., benzene). A solution of the hydroxy acid in benzene is cooled to about 5° C. and thionyl chloride is added slowly. When the addition is finished, the reaction mixture is heated to complete the reaction. This will yield the corresponding acid chloride which can be converted to the acid by hydrolysis or to the amide by treatment with ammonia. The same type of conversion to the chloride may be carried out by using phosphorus oxychloride either alone or in the presence of a tertiary amine.

The Y=bromo compound may be prepared by slowly adding freshly prepared phosphorus tribromide to the hydroxy acid compound which is cooled to —10° C. and stirred. The temperature of the liquid is kept below 0° C. throughout the addition. When all the $PBr_3$ is added, the cooling bath is removed and stirring is continued until the liquid reaches room temperature. The reaction mixture may then be worked up as described for the chloro compound. The iodine compound may be similarly prepared by employing phosphorus and iodine.

The compound wherein Y is $NH_2$ and Z is $NH_2$ or OH may be prepared by reacting, for example, a 3-halo-4-cyclohexylacetophenone with ammonia and hydrogen cyanide to give the amino nitrile and this is either partially hydrolyzed (i.e., fortified HC1) to the amide or completely hydrolyzed to the acid by heating with aqueous acid.

The compound wherein Y is $SO_2R_1$ may be prepared by a nucleophilic displacement of a halide (Y=chloro or bromo) by the anion —SR. For example, thiophenol is dissolved in alcohol, then neutralized with sodium ethoxide. The neutral solution is added to a solution of the ester of the chloro or bromo compound previously prepared and the mixture refluxed for 1.5 hours. The organic filtrate is then concentrated to yield the $SR_1$ compound. This compound is then oxidized to the corresponding sulfone by hydrogen peroxide: the ester is dissolved in acetic acid and treated with 30% hydrogen peroxide. After 30 minutes at 100° C., more hydrogen peroxide is added. After another 30 minutes, the solution is cooled, poured into water and the product (Y=$SO_2R_1$, Z=alkoxy) extracted.

PREPARATION OF INTERMEDIATE VI (PROCESS G)

1-(3'-halo-4'-cyclohexylphenyl) lower alkyl metal or metal halide

These intermediates may be prepared by well-known procedures for obtaining organo-metallic compounds.

The compounds may be represented by the following formula

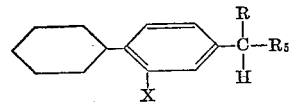

wherein $R_5$ is MgX, CdX, ZnX, AlX, Na, Li, or K (X is halogen); R and X are same as Process B.

For example, the 1-(3'-halo-4'-cyclohexylphenyl) lower alkyl magnesium halide may be prepared by the well-known Grignard reaction upon the product of Process B, Step 2. The corresponding cadmium, zinc or aluminum compound may be prepared by reaction of the MgX compound with a cadmium halide, zinc halide or aluminum halide (preferably the chlorides) under reaction conditions well-known to the art. The organo alkali metal compound may be prepared by reaction of the halide obtained from Process B, Step 2, with alkali metal or its ethoxide under well-known conditions.

PREPARATION OF INTERMEDIATE VII

3-halo-4-cyclohexylbenzoic acid

This intermediate may be prepared by several procedures. In one procedure a 3-halo-4-cyclohexylacetophenone is oxidized directly to the benzoic acid compound. In another procedure a 3-halo-4-cyclohexylphenyl magnesium halide undergoes a Grignard reaction with carbon dioxide, followed by acid hydrolysis to form the Intermediate VII.

These reactions are illustrated in Flow Sheet H, and the reactions and conditions that follow further describe our invention.

PROCESS H 3-halo-4-cyclohexylbenzoic acid

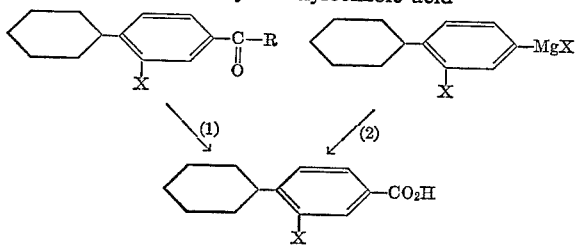

Equivalents: X and R are same as Process A.

REACTIONS AND CONDITIONS

Step 1.—Oxidation of a methyl ketone to the acid by any of the well-known methods in the art, for example, reaction with an alkali hypohalite or by the Baeyer-Villiger oxidation of ketones with peracids, such as perbenzoic acid, peracetic acid and the like and subsequent base hydrolysis; preferably, however, the reaction is carried out with an alkali hypohalite, especially sodium hypochlorite and subsequent acidification with an acid (i.e., a mineral acid, preferably HCl). (When R is other than methyl, the oxidation is carried out using the Baeyer-Villiger method.)

Step 2.—Reaction by the well-known Grignard reaction and variations thereof; i.e., using solid or gaseous carbon dioxide and subsequent hydrolysis.

Once the intermediates are prepared, they may be further reacted in accordance with our process to prepare the α-lower alkyl-(3-halo-4-cyclohexylphenyl) acetic acid compounds, and particularly α-methyl-(3-chloro-4-cyclohexylphenyl) acetic acid.

The remaining process steps of our invention will be discussed in relation to the reactions of each of the intermediates previously described.

The process for preparing the α-lower alkyl-(3-halo-4-cyclohexylphenyl) acetic acid through Intermediate I [α-lower alkyl-(3-halo-4-cyclohexylphenyl) acetonitrile] is completed by hydrolysis of the nitrile to the corresponding acid by any of the well-known methods in the art, for example, by an acid or base catalyzed hydrolysis of a nitrile to an acid. Alternatively, the amide may be first prepared, for example, by reaction with fortified HCl at ice-bath temperatures, followed by hydrolysis of the amide to the acid. It is preferred, however, that the hydrolysis be carried out upon α-methyl-(3-chloro-4-cyclohexylphenyl) acetonitrile under acid conditions, such as the use of a mineral acid, preferably sulfuric acid, with or without an inert solvent at elevated temperatures (preferably at or near the reflux temperature of the system) until the reaction is substantially complete.

The process for preparing the α-lower alkyl-(3-halo-4-cyclohexylphenyl) acetic acid through Intermediate II [α-lower alkyl-(3-halo-4-cyclohexylphenyl) acetaldehyde or the corresponding methyl ketone] is completed by methods well-known in the art for the oxidation of an aldehyde or ketone to the corresponding acid. For example, the aldehyde may be oxidized with a dichromate, nitric acid, potassium permanganate solution and the like; or the methyl ketone may be oxidized via a haloform reaction using alkali hypohalite, or by peracids (Baeyer-Villiger reaction) and the like. When the aldehyde is to be oxidized, it is possible to use an alkali dichromate (preferably sodium dichromate) in an inert solvent (such as water) at any suitable temperature, preferably at ambient temperatures until the reaction is complete. When the methyl ketone is to be oxidized, it is preferred to use an alkali hypohalite (preferably sodium or potassium hypochlorite) in an inert solvent (such as water) at elevated temperatures, preferably 50°–100° C. and subsequent acidification of the salt. By far the most preferred method is $HNO_3$ oxidation.

The process for preparing the α-lower alkyl-(3-halo-4-cyclohexylphenyl) acetic acid through the Intermediate III [(3-halo-4-cyclohexylphenyl) acetic acid] is completed by the alkylation of the α-carbon of Intermediate III. For example, these last steps may be carried out by esterifying Intermediate III, reaction of the ester with sodamide, α-alkylation of the salt with a lower alkyl halide and hydrolysis of the ester to the free acid. Alternatively, the acid intermediate itself may be reacted with the sodamide and subsequent alkylation with a lower alkyl halide, followed by acidification.

The flow sheet that follows illustrates these reactions, and the subsequent reactions and conditions further illustrate our invention.

PROCESS $D_1$

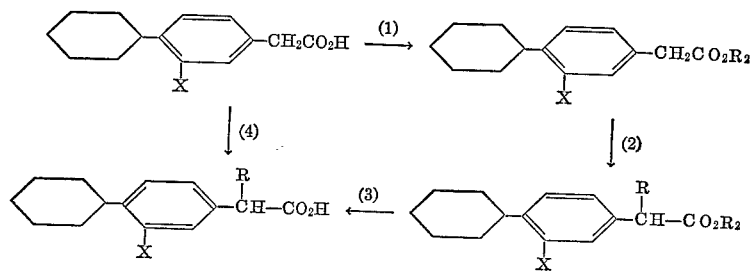

Equivalents: R is lower alkyl; R₂ is any suitable esterifying group, preferably lower alkyl.

PROCESS F₁

α-Substituted to final acid

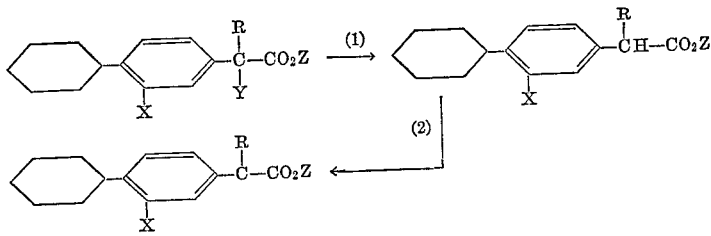

Equivalents: R, X, Y and Z as previously described.

REACTIONS AND CONDITIONS

Step 1.—Esterification by any means well-known in the art.

Step 2.—α-Alkylation by any method well-known to the art, for example, reaction with an alkali alcoholate or any strong base of comparable basic strength; preferably sodamide, in an inert solvent (i.e., DMF, benzene, toluene), preferably ether, and subsequent addition of a lower alkyl halide (methyl iodide, propyl bromide and the like), preferably methyl iodide at any suitable temperature, preferably ambient temperatures, until the alkylation is substantially complete, followed by acidification of the reaction mixture (i.e., a mineral acid, carboxyilc acid and the like, preferably a mineral acid and especially hydrochloric acid). Alternatively, the alkylation may be carried out by activating the α-carbon of the side chain by reacting with an α-dilower alkyl oxalate, alkylation with a lower alkyl halide and subsequent hydrolysis.

Step 3.—Reaction by any well-known means for hydrolysis of an ester to its corresponding acid. For example, acid or basic aqueous hydrolysis; preferably hydrolysis with an aqueous alkali or alkali earth hydroxide in an inert solvent (i.e., alcohols) at elevated temperatures, preferably at or near the reflux temperature of the system, until hydrolysis is substantially complete, followed by acid treatment of the salt by well-known methods to form the free acid.

Step 4.—Same as step 2, however, in this case at least a slight excess of a mole of sodamide to a mole of free acid (preferably 2 moles) and subsequent acidification as indicated.

The process for preparing the α-lower alkyl-(3-halo-4-cyclohexylphenyl) acetic acid through the Intermediate IV [α-lower alkyl-α-(3-halo-4-cyclohexylphenyl) malonic ester or acid] is completed by any well-known methods of the art for decarboxylation of a malonic acid. For example, heating the malonic acid compound above its melting point, or alternatively simultaneously hydrolyzing and decarboxylating the malonate ester by continuous acid or basic hydrolysis at elevated temperatures, However, it is preferred to hydrolyze the ester to the free malonic acid; isolation of the compound is then followed by thermal decarboxylation.

The preparation of the α-lower alkyl-(3-halo-4-cyclohexylphenyl) acetic acid through the Intermediate V, and its other α-substituted α-lower alkyl acetic acids, is carried out by a direct reduction of the α-substituted functional substituent and subsequent hydrolysis (where needed) of the amide.

These reactions are illustrated in the following flow sheet and the reactions and conditions that follow further illustrate our invention.

REACTIONS AND CONDITIONS

Step 1.—Catalytic reduction by methods well-known to the art, for example, reduction over a catalyst, such as palladium, platinum, Raney nickel and the like, preferably 5–10% platinum oxide under moderate hydrogen pressure (5–60 pounds, preferably 40 pounds) in an inert solvent, such as lower alkanols (methanol, ethanol, butanol and the like), aromatic compounds (benzene, toulene, xylene and the like), tetrahydrofuran, dioxane, acetic acid and the like at any suitable temperature (0° C. to the reflux temperature of the system, preferably at room temperature) in ethanol until the reaction is substantially complete.

Step 2.—When Z is NH₂, hydrolysis of the amide to the corresponding acid by methods well known to the art; i.e. basic or acid hydrolysis.

In reaction Step 1 the reduction is preferably carried out with Raney nickel when the intermediate is the optically active compound.

Alternatively the α-hydroxy amide (or acid) (the racemate, or optically active form) may be converted to and α-ester moiety, by esterification of the α-hydroxy according to methods well known in the art. Particularly, preferred is the preparation of the lα-benzoate α-methyl acid or (amide), by reaction of the lα-hydroxy, with benzoyl chloride. When this α-ester compound (especially lα-benzoate α-methyl (3-halo-4-cyclohexylphenyl) acetic acid) is prepared it is especially preferred to carry out the reduction with palladium (Pd) in the presence of an organic amine such as triethylamine. When the lα-benzoate compound is reduced with palladium as described an inversion takes place and the product is the d acid or amide. The procedure affords a direct method of reducing the α-ester as well as converting the unwanted l isomer to the desired d compound.

Another process for preparing the α-lower alkyl-(3-halo-4-cyclohexylphenyl) acetic acid compound is through Intermediate VI [1-(3-halo-4-cyclohexylphenyl) lower alkyl metal or metal halide]. This organo-metallic compound (Intermediate VI) is reacted as described in Process D, Step 2, to form the final acetic acid compound.

The final acetic acid compound may also be prepared through the benzoic acid compound (Intermediate VII). The benzoic acid compound may be converted to its corresponding acid halide, which may be reacted with a diazoalkane to form the corresponding α-diazo compound. The latter compound may then be converted to the corresponding ester or amide followed by hydrolysis to the desired free acid or the free acid may be directly prepared from the α-diazo compound.

These reactions are illustrated in the following flow sheet and the reactions and conditions that follow further describe our invention.

PROCESS H₁

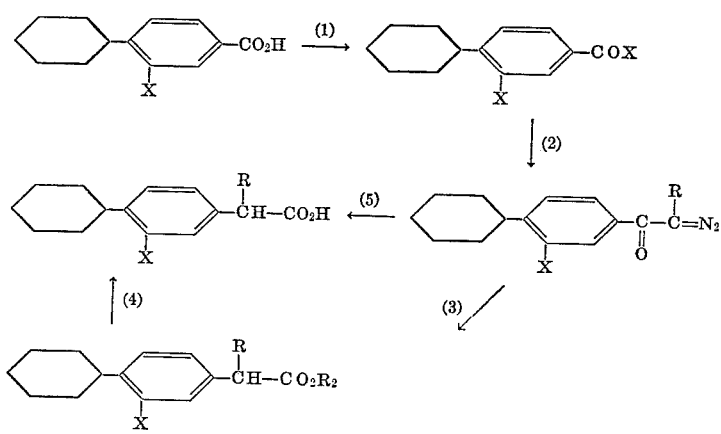

Equivalents: R=lower alkyl, R₂=any esterifying group, particularly lower alkyl.

REACTIONS AND CONDITIONS

Step 1.—Reaction by any of the well-known means for preparing acid halides. For example, reaction with a thionyl halide (preferably thionyl chloride) or reaction with a phosphorus halide (such as PBr₃, PCl₅ and the like) or reaction with oxalyl chloride and the like. Preferably, the reaction is carried out with thionyl chloride at elevated temperatures (preferably at or near 100° C.) until the reaction is substantially complete.

Step 2.—Reaction by any well-known method for the preparation of a diazoketone from acids via the acid halide. For example, reaction of the acid halide with a diazoalkane, preferably reaction with diazoethane at low temperatures with a solvent in the presence of a base, such as a tertiary aliphatic or aromatic amine.

Step 3.—Reaction by the well-known Wolff type rearrangement. For example, reaction with an alcohol (alkanol or ar-alkanol), preferably a high boiling alcohol, such as benzyl alcohol, at elevated temperatures (preferably at or near the reflux temperature of the system) until the reaction is substantially complete. Inert solvents, such as benzene or toluene, may be used, but it is preferred to use the alcohol itself as the solvent. Alternatively, the reaction may be carried out under ultraviolet light or other suitable catalysts.

Step 4.—Conversion of an ester to the corresponding acid by methods well-known in the art (i.e., hydrolysis or saponification).

Step 5.—This reaction is similar to Step 3, except that water is used in place of the alcohol, and preferably the use of a water-miscible inert solvent, such as tetrahydrofuran or dioxane and the like. This reaction, like Step 3, is carried out under Wolff rearrangement conditions. Therefore, the reaction may also be run with an amine, thereby first preparing the amide compound, followed by hydrolysis to the desired acid.

Still another process for preparing the α-lower alkyl-(3-halo-4-cyclohexylphenyl) acetic acid compound is through either halide (obtained from the process for preparing Intermediate I) or through a 3-halo-4-cyclohexylphenyl magnesium halide compound (obtained from the process for preparing Intermediate II). The halide may be reacted with carbon monoxide under acid conditions to produce directly the final compound. Alternatively, the halide compound may be first dehydrohalogenated to the corresponding olefin, which through a carbonation reaction may be converted to the final acid compound. When the magnesium halide compound is used, a standard Grignard reaction is carried out with the ester of an α-halo acid to produce the corresponding ester and hydrolysis to produce the desired final acid compound.

These reactions are illustrated in the following flow sheet and the reactions and conditions that follow further describe our invention.

PROCESS I.—(Equivalents as defined above)

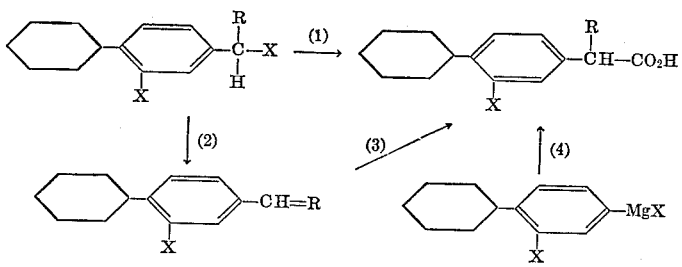

REACTIONS AND CONDITIONS

Step 1.—Reaction with carbon monoxide (CO) under acid conditions (preferably 90% H₂SO₄, especially 96% or greater) followed by quenching with water. CO may be used directly or it may be generated in situ, i.e., by using formic acid in the mixture. Many strong acids may be used, preferably a strong, essentialy an anhydrous mineral acid, such as sulfuric, polyphosphoric, pyrophosphoric and the like; but especially concentrated sulfuric acid. The reaction is preferably carried out at ambient temperatures or below, but especially ice bath temperatures. However, higher temperatures may be used, but in that event it is preferred to carry out the reaction in a sealed vessel. Any suitable inert solvent may be used in the reaction, (i.e., anhydrous phosphoric acid), but it is preferred that the acid itself be used as the solvent. Alternatively, this reaction may be carried out under pressure with a mixture of hydrogen fluoride and carbon monoxide.

Step 2.—Reaction by any well-known dehydration or dehydrohalogenation procedure to a styrene type derivative. In this reaction the X (on the aliphatic side chain) in the flow sheet may be a halogen or a hydroxy group (preferably a hydroxy group obtained from the process for preparing Intermediate I). For example, the dehydration may be carried out under acid or basic conditions; when acid conditions are employed, the procedure of Step 1, Process F₁, may be used. It is preferred to carry out the reaction under basic conditions (i.e., using an alkali or alkali earth hydroxide, preferably KOH), with an inert solvent, (i.e., ethylene-glycol). Alternatively, the reaction may be carried in the absence of a solvent.

Step 3.—Reaction by any well-known means for carboxylation of an olefin. For example, reaction under conditions indicated in Step 1 above.

Step 4.—Reaction by the well-known Grignard reaction. For example, reaction with an ester of an α-halo aliphatic acid, preferably ethyl-α-chloro propionate, and subsequent de-esterification (hydrolysis or saponification) by means well-known to the art to form the desired acid compound.

Our invention for the preparation of the α-lower alkyl-(3-halo-4-cyclohexylphenyl) acetic acid is not to be restricted to the flow sheets previously shown, the latter being only some of the procedures. For example, the 3-halo group need not be on the starting or intermediate compounds to begin with. The halo group may be placed in the 3-position, at any stage of the synthesis by reactions which are well-known in the art. For example, the starting material in any of the processes may be nitrated to obtain the 3-nitro compound, which group may be reduced to the amine group, followed by diazotization and reaction to form the 3-halo compound, or formation of the corresponding phenol, and subsequent displacement with a halogen; i.e., reaction with PCl₅. Alternatively, the nitration and/or the subsequent reactions to prepare the halo group may be carried out at any other suitable stage of the synthesis. In particular, if it is desired, the processes previously described may be carried out without a functional substituent at the 3-position. Once the α-lower alkyl-4-cyclohexylphenyl acetic acid compound is prepared, the 3-position may be reacted by well-known means to form the corresponding desired 3-halo compound, (i.e., as shown above). Alternatively, the 3-halo group may be obtained by direct halogenation at any suitable stage of the synthesis.

Each of the previous processes have been carried out with the cyclohexyl functional substituent on the reacting compounds; this also is not to be considered a limitation of our invention. The previous processes have concerned themselves with the various methods for obtaining our desired aliphatic acid side chain. Incorporated with these methods the cyclohexyl moiety may be placed in the para-position at any suitable stage of the aliphatic acid side chain synthesis. For example, any of the starting materials may contain a vinyl group in the para-position in place of the cyclohexyl moiety, thereby starting with a styrene type compound. Alternatively, the vinyl group may be placed on the phenyl moiety at any suitable stage in the preparatioin of the aliphatic acid side chain. For example, benzene or chlorobenzene or any of the other suitable intermediates may be reacted with ethylene in the presence of phosphoric acid to form the corresponding ethyl benzene compound. This compound may then be dehydrogenated or halogenated with subsequent removal of hydrogen halide to form the styrene compound. The styrene type compound may be made at other suitable stages of the aliphatic side chain synthesis (i.e., at the ketone stage). Once the vinyl moiety is obtained, it may be converted to the cyclohexenyl substituent at any step along the synthesis by a standard Diels Alder type reaction using butadiene or biacetylene as the diene. This cyclohexenyl moiety may then be immediately hydrogenated to form the cyclohexyl moiety, or it may be carried along to any suitable subsequent stage of the synthesis and then hydrogenated to the desired cyclyhexyl moiety. Further, the cyclo-hexyl moiety may be added not only at any suitable point in the synthesis but also after the acid side chain has been obtained. Again this can be accomplished by any method known to the art, i.e., formation of the vinyl substituent and subsequent reaction to the cyclohexyl moiety. Preferably the cyclohexyl moiety may be added, after the acid side chain has been obtained, by a cycloalkylation reaction. For example, cyclohexyl-p-toluenesulfonate may be reacted with α-methyl 3-chloro-phenylacetic acid ethyl ester (prepared from the corresponding acid by esterification) followed by hydrolysis of the ester to form the desired 4-cyclohexylphenylacetic acid compound. A suitable procedure for preparing the 3-chlorophenylacetic acid is as follows: alkylation of chlorobenzene with ethylene in the presence of aluminum chloride to form m-ethyl chlorobenzene, halogenation (chlorination) of this compound with chlorine in the presence of PCl₃ and U.V. light form α-methyl-3-chloro chloromethylbenzene reaction with KCN to form the corresponding acetonitrile followed by hydrolysis to form the α-methyl 3-chlorophenylacetic acid.

Other procedures for adding the acid side chain aside from those already described are within the contemplation of this invention. For example, 4-cyclohexyldihydroresorcinol, prepared by a Friedel Crafts cyclohexylation of resorcinol and subsequent reduction is condensed with a Wittig reagent of the type

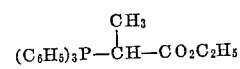

in the presence of a strong base such as phenyl-lithium to afford ethyl α-(4-cyclohexyl-3-ketocyclohexylidene) propionate; this compound is then treated with phosphorous pentachloride to convert the keto group to the gem dichloride; this is followed by dehydrohalogenation using a base such as potassium t-butoxide to obtain ethyl α-(4 - cyclo - hexyl - 3 - chlorocyclohex - 2 - enylidene) propionate; the exo-cyclic double bond of this compound is then isomerized into the ring to form the correspnding diene compound which in turn is dehydrogenated to esters of the final α-methyl-(3-chloro-4-cyclohexylphenyl) acetic acid. If the free acid is desired, any well-known de-esterification technique may be used.

Still another procedure is as follows: 2-cyclohexylcyclohexanone is reacted with PCl₅ to form the corresponding dichloro compound; this compound is then reacted with potassium t-butoxide to effect elimination of HCl and afford the corresponding vinyl chloride compound; this compound is then reacted with N-halo succinamide to effect allylic halogenation and form 1,3-dichloro-6-cyclohexylcyclohex-1-ene. The cyclo-1-ene compound is then reacted with the anion of ethyl propionate, which is formed in the presence of a strong base, to obtain the ethyl ester of α-methyl-(3-chloro-4-cyclohexycyclohex-2-enyl) acetic acid; dehydrogenation of the cyclohex-2-enyl moiety yields the ethyl ester of α - methyl - (3 - chloro - 4-cyclohexylphenyl) acetic acid. The ester may be de-esterified to the acid by well-known means.

A variety of procedures well known in the art for the preparation of an ester without just going through the corresponding acid are also within the contemplation of this invention. For example, α-methyl-(3-chloro-4-cyclohexylphenyl) acetonitrile may be reacted with an alcohol in ether in the presence of HCl at low temperatures to form the corresponding imido ester hydrochloride. This compound may then be hydrolyzed to the ester of α-methyl - (3 - chloro - 4 - cyclohexylphenyl) acetic acid. Alternatively, α - methyl (3 - chloro - 4 - cyclohexylphenyl) acetamide may be reacted with alcohol in the presence of an acid to yield the corresponding ester.

The formation of the 3-halo substituent at any stage may be employed in conjunction with the preparation of the cyclohexyl moiety and the acid side chain so that a great many variations in the processes may be advantageously employed.

The following examples are given by way of illustration.

EXAMPLE 1

3-chloro-4-cyclohexylacetophenone

A. 4-CYCLOHEXYLACETOPHENONE

A mixture of 0.10 mole of anhydrous aluminum chloride and 26.6 ml. of ethylene dichloride is stirred and cooled to −20° C. 0.10 mole of acetyl chloride is then added dropwise over a period of 30 minutes. After this addition is completed, the mixture is aged for 15 minutes at −15° C. 0.10 mole of cyclohexylbenzene is then added dropwise over a period of 1 hour with stirring at −15 to −10° C. The reaction mixture is then stirred overnight at room temperature.

B. 3-CHLORO-4-CYCLOHEXYLACETOPHENONE

To the reaction mixture of Part A is added 0.15 mole of aluminum chloride. The reaction mixture is then stirred for 10 minutes, followed by the addition of 0.10 mole of chlorine over a period of 1.5 hours. The reaction mixture is then aged for 2 hours, and quenched into 1 kg. of crushed ice and 100 ml. of hydrochloric acid with stirring. After an hour 100 ml. of ethylene dichloride is added to this reaction mixture and the organic phase separated. The organic phase is then washed with 2.5 N hydrochloric acid (3×100 ml.), with saturated sodium bicarbonate solution (1×100 ml.), with water (1×100 ml.) and then dried over magnesium sulfate. The filtrate is then concentrated in vacuo to an oil. 2.8 grams of this oil is then dissolved in 3 ml. of (1:1) benzene:petroleum ether and chromatographed on a silica gel column to yield pure 3-chlor-4-cyclohexylacetophenone.

EXAMPLE 2

3-chloro-4-cyclohexylacetophenone

A mixture of 5.63 moles of aluminum chloride and 2.2 moles of 4-cyclohexylacetophenone is allowed to stand until the mixture of solids begins to melt. At this point stirring is begun, the reaction mixture is heated to 75° C. to form the molten complex, and subsequently cooled over a period of 30 minutes to room temperature. To this mixture is then added 450 ml. of ethylene dichloride with stirring. 2.25 moles of chlorine is then passed into the reaction mixture over a period of 13 hours. After an additional 2.5 hour period, the reaction mixture is quenched into 5 kg. of crushed ice and 500 ml. of hydrochloric acid with stirring. After an hour 500 ml. of ethylene dichloride is added to this reaction mixture and the organic phase separated. The organic phase is then washed with 2.5 N hydrochloric acid (3× 500 ml.), with saturated sodium bicarbonate solution (1× 500 ml.), with water (1× 500 ml.) and then dried over magnesium sulfate. The filtrate is then concentrated in vacuo to an oil. 14 grams of this oil is then dissolved in 15 ml. of (1:1) benzene:petroleum ether and chromatographed on a silica gel column to yield pure 3-chloro-4-cyclohexylacetophenone.

Alternatively, in the above procedure, the ketone AlCl$_3$ complex is formed by combining the solid reactants, then heating to form the molten complex. In an alternate procedure, this complex may be formed more conveniently by mixing 2.2 moles of 4-cyclohexylacetophenone and 5.63 moles of aluminum chloride in the presence of 450 ml. ethylene dichloride solvent at room temperature.

EXAMPLE 3

2-cyclohexylchlorobenzene

To a mixture of 2.2 moles of aluminum chloride and 2.2 moles of cyclohexylbenzene is added 450 ml. of ethylene dichloride with stirring. 2.25 moles of chlorine is then passed into the reaction mixture over a period of 13 hours. After an additional 2.5-hour period, the reaction mixture is quenched with stirring in 5 kg. of crushed ice and 500 ml. of hydrochloric acid. After an hour, 500 ml. of ethylene dichloride is added to this mixture and the organic phase separated. The organic phase is then washed with 2.5 N hydrochloric acid (2× 500 ml.), with saturated sodium bicarbonate solution (1× 500 ml.), with water (1× 500 ml.), and then dried over magnesium sulfate. The filtrate is then concentrated in vacuo and the residual oil dissolved in 15 ml. of (1:1) benzene:petroleum ether and chromatographed on a silica gel column to yield 2-cyclohexylchlorobenzene.

EXAMPLE 4 dl-α-(3-chloro-4-cyclohexylphenyl) ethyl alcohol

To a stirred slurry of 0.0528 mole of sodium borohydride in 25 ml. of ethanol is added dropwise a solution of 0.1056 mole of 3-chloro-4-cyclohexylacetophenone in 25 ml. of ethanol at room temperature. After stirring the reaction mixture at room temperature for 1 hour, 50 ml. of cold water is added, followed by slow addition of 0.0538 mole of acetic acid. The reaction mixture is then concentrated in vacuo to one-half its volume and the concentrate extracted with chloroform (3× 50 ml.). The combined extracts are then washed well with aqueous sodium bicarbonate solution (2× 100 ml.), with water (2× 100 ml.), and then stirred with 1 gram of charcoal and magnesium sulfate. The mixture is then filtered and the filtrate concentrated in vacuo to yield dl-α-(3-chloro-4-cyclohexylphenyl) ethyl alcohol.

The phenylurethan derivative has M.P. 104.5–106.0° C.

EXAMPLE 5 dl-α-(3-chloro-4-cyclohexylphenyl) ethyl bromide

To a well-stirred solution of 0.1047 mole of dl-α-(3-chloro-4-cyclohexylphenyl) ethyl alcohol in 125 ml. of benzene cooled to 5° C. is added gaseous hydrogen bromide. After the reaction mixture is saturated with hydrogen bromide gas, stirring is continued for an additional 30 minutes at 5° C. The aqueous phase is then removed, and the benzene phase is stirred at room temperature for 15 minutes with anhydrous sodium sulfate. The benzene mixture is then filtered and the dry filtrate concentrated in vacuo.

*Analysis.*—Calculated for $C_{14}H_{18}BrCl$: C, 55.75%; H, 6.01%; Br, 26.50. Found: C, 55.86%; H, 6.10%; Br, 26.00%.

EXAMPLE 6

3-chloro-4-cyclohexylbenzyl chloride

A stirred mixture of 105 g. of 2-cyclohexylchlorobenzene, 16 g. of paraformaldehyde and 300 ml. of concentrated hydrochloric acid is heated at 70° C. The heating is continued over a period of 8 hours while a steady stream of hydrogen chloride is passed into the reaction mixture. The organic phase is then separated from the reaction mixture and washed successively with aqueous sodium bicarbonate solution and water and dried over magnesium sulfate. The organic phase is then concentrated in vacuo and the residual oil chromatographed to yield 3-chloro-4-cyclohexylbenzyl chloride.

EXAMPLE 7 dl-α-Methyl-(3-chloro-4-cyclohexylphenyl) acetonitrile

To a mixture of 0.141 mole of sodium cyanide and 110 ml. of dimethyl sulfoxide is added dropwise with stirring at 60° C. 0.0941 mole of dl-α-(3-chloro-4-cyclohexylphenyl) ethyl bromide. After the addition is completed, the reaction mixture is heated to 75° C. and maintained at that temperature for an additional hour. The reaction mixture is then cooled to room temperature, at which point 325 ml. of water and 325 ml. of petroleum ether are added. The aqueous phase is then separated and extracted further with petroleum ether (3× 50 ml.). The combined organic extracts are then stirred with 2.5 grams of charcoal and magnesium sulfate, filtered and the filtrate concentrated in vacuo to yield dl-α-methyl-(3-chloro-4-cyclohexylphenyl) acetonitrile.

When 3-chloro-4-cyclohexylbenzyl chloride obtained from Example 6 is used in place of dl-α-(3-chloro-4-cyclohexylphenyl) ethyl bromide in the above example, there is obtained 3-chloro-4-cyclohexylphenyl acetonitrile.

EXAMPLE 8 dl-α-Methyl-(3-chloro-4-cyclohexylphenyl) acetonitrile

A stirred mixture of 0.8 mole of (3-chloro-4-cyclohexylphenyl) acetonitrile, 0.8 mole of methyl bromide and 50 ml. of dry ether are heated to reflux. A suspension of finely powdered sodamide in 400 ml. of dry ether is then added. After refluxing for an additional 1 hour, the reaction mixture is then cooled, water added and the ether layer separated, washed with water, dried over magnesium sulfate and concentrated in vacuo to yield dl-α-methyl-(3-chloro-4-cyclohexylphenyl) acetonitrile.

EXAMPLE 9 dl-α-Methyl-(3-chloro-4-cyclohexylphenyl) acetonitrile

A mixture of 0.1 mole of anhydrous aluminum chloride and 30 ml. of ethylene dichloride is stirred and cooled to −20°. Then 0.10 mole of α-chloropropionitrile dissolved in 20 ml. of ethylene dichloride is added dropwise over a period of 30 minutes. When the addition is complete, the mixture is aged for 15 minutes at −15°. To this is added 2-cyclohexylchlorobenzene dropwise over a period of one hour at −15 to −10°. The reaction mixture is then aged for several hours, and then quenched into 500 g. of crushed ice and 100 ml. of hydrochloric acid, with good stirring. After 10 minutes, the organic phase is separated, washed with dilute hydrochloric acid (2× 100 ml.), with saturated aqueous sodium bicarbonate solution (1× 100 ml.), with water (1× 100 ml.) and then dried over magnesium sulfate, and filtered. The filtrate is then concentrated in vacuo to an oil. This oil is dissolved in a small volume of (1:1) benzene:petroleum ether and chromatographed on a silica gel column to give dl-α-methyl-(3-chloro-4-cyclohexylphenyl) acetonitrile.

When α-bromopropionitrile is used in place of α-chloropropionitrile in the above example, there is obtained dl-α-methyl-(3-chloro-4-cyclohexylphenyl) acetonitrile.

EXAMPLE 10 dl-Ethyl-α-methyl-(3-chloro-4-cyclohexylphenyl) acetate

The procedure of Example 9 is followed using α-chloroethylpropionate in place of α-chloropropionitrile to obtain dl-ethyl-α-methyl-(3-chloro-4-cyclohexylphenyl) acetate.

When α-hydroxyethyl propionate, α-phenylsulfonyloxyethyl propionate and α-acetoxyethyl propionate are used in place of α-chloropropionitrile, there is obtained dl-ethyl-α-methyl-(3-chloro-4-cyclohexylphenyl) acetate.

EXAMPLE 11 dl-α-Methyl-(3-chloro-4-cyclohexylphenyl) acetic acid

To 2.0841 moles of dl-α-methyl-(3-chloro-4-cyclohexylphenyl) acetonitrile is added 21 ml. of glacial acetic acid, 18 ml. of water and 23 ml. of concentrated sulfuric acid (ca. 35% sulfuric acid by volume). The stirred reaction mixture is then heated to 100° C. and kept at that temperature overnight. The reaction mixture is cooled to room temperature and 200 ml. of water added. The product is then extracted with petroleum ether (3× 50 ml.) and the combined organic extracts washed well with water (2× 100 ml.), stirred with 2 grams of charcoal and magnesium sulfate and filtered. The filtrate is concentrated in vacuo to yield dl-α-methyl-(3-chloro-4-cyclohexylphenyl) acetic acid.

U.V. in methanol

| λ max.: | E percent |
|---|---|
| 2770 | 22.1 |
| 2680 | 26.6 |
| 2600 | 26.6 |

When (3-chloro-4-cyclohexylphenyl) acetonitrile obtained from Example 7 is used in place of dl-α-methyl-(3-chloro-4-cyclohexylphenyl) acetonitrile in the above example, there is obtained (3-chloro-4-cyclohexylphenyl) acetic acid.

EXAMPLE 12 dl-α-Methyl-(3-chloro-4-cyclohexylphenyl) acetic acid

A stirred solution of 4.0 moles of concentrated sulfuric acid containing 5 ml. of formic acid is cooled to about 5°. To this is added simultaneously 0.5 mole of dl-α-(3-chloro-4-cyclohexylphenyl) ethyl bromide dissolved in 50 ml. n-pentane and 1.0 mole of formic acid. The addition takes about 1 hour, the temperature being maintained at 0–5°. The cooling bath is then removed, and the reaction mixture allowed to stir at room temperature for an additional hour.

The reaction mixture is then poured cautiously onto 500 g. of ice. The organic phase is separated from the aqueous acid phase, and the latter is extracted further with petroleum ether (2× 100 ml.). The organic phases are combined and the product acid is extracted from it with 2 N KOH. The basic extract is washed free of neutral materials by petroleum ether (1× 100 ml.), and then acidified with concentrated hydrochloric acid. The oily product which separates is removed by extraction with petroleum ether (3× 50 ml.). The organic extracts are combined, washed with water (2× 150 ml.), stirred with 5 g. of charcoal and magnesium sulfate, filtered, and the solvent removed under reduced pressure to obtain dl-α-methyl-(3-chloro-4-cyclohexylphenyl)-acetic acid.

Similarly, when α-(3-chloro-4-cyclohexylphenyl) ethyl alcohol, is used in place of α-(3-chloro-4-cyclohexylphenyl) ethyl bromide in the above example, there is obtained dl-α-methyl-(3-chloro-4-cyclohexylphenyl) acetic acid.

EXAMPLE 13

3-chloro-4-cyclohexylstyrene

In a 500 ml. three-necked round-bottom flask equipped with a 250 ml. addition funnel and an efficient take-off fractionating column fitted with a 500 ml. receiving flask is placed 12.5 g. of powdered fused potassium acid sulfate and 0.01 g. of picric acid. The flask is immersed in an oil bath maintained at about 230°, and 1.0 mole of dl-α-(3-chloro-4-cyclohexylphenyl) ethyl alcohol and 0.01 g. of picric acid are placed in the addition funnel. The system is evacuated to a pressure of 110 mm., and the alcohol is added dropwise. The pressure is gradually reduced until the 3-chloro-4-cyclohexylstyrene-water mixture begins to distill and collect in the receiving flask. When the addition is complete (6 hours), the pressure is held constant until distillation stops, and it is then reduced further until no more liquid distills. The distillate is transferred to a separatory funnel with the aid of 50 ml. ether, the organic layer is separated, dried over magnesium sulfate, filtered and treated with 0.01 g. of picric acid The solvent is removed, and the residue is distilled under reduced pressure to give 3-chloro-4-cyclohexylstyrene.

EXAMPLE 14 dl-α-Methyl-(3-chloro-4-cyclohexylphenyl) acetic acid

The procedure of Example 12 is employed using 3-chloro-4-cyclohexylstyrene in place of dl-α-(3-chloro-4-cyclohexylphenyl) ethyl bromide, to obtain dl-α-methyl-(3-chloro-4-cyclohexylphenyl) acetic acid.

EXAMPLE 15 dl-α-Methyl-(3-chloro-4-cyclohexylphenyl) acetic acid

A. α-(3-CHLORO-4-CYCLOHEXYLPHENYL) ETHYL MAGNESIUM BROMIDE

A mixture of 0.11 mole of dry magnesium turnings, 50 ml. of dry ether, a crystal of iodine and a small amount of dl-α-(3-chloro-4-cyclohexylphenyl) ethyl bromide is stirred and warmed. When initial reaction occurs, the remainder of 0.019 mole of dl-α-(3-chloro-4-cyclohexylphenyl) ethyl bromide in 100 ml. of ether is slowly added. After initial reaction appears to be completed, the reaction mixture is refluxed until no more magnesium dissolves. The reaction mixture is then filtered.

B. dl-α-METHYL-(3-CHLORO-4-CYCLOHEXYLPHENYL) ACETIC ACID

Sufficient carbon dioxide gas is bubbled through the ethereal solution obtained from part A while stirring to enable complete reaction of the Grignard reagent. At this point 0.2 mole of dilute aqueous hydrochloric acid is added to the stirred reaction mixture. The reaction is then filtered, the organic phase separated, washed with water (2× 100 ml.), dried over magnesium sulfate, and the filtrate concentrated in vacuo to yield dl-α-methyl-(3-chloro-4-cyclohexylphenyl) acetic acid.

When (3-chloro-4-cyclohexylphenyl) methyl chloride is used in part A above in place of dl-α-(3-chloro-4-cyclohexylphenyl) ethyl bromide and the product therefrom used in part B above, there is obtained (3-chloro-4-cyclohexylphenyl) acetic acid.

EXAMPLE 16

Ethyl-β-methyl-β-(3-chloro-4-cyclohexylphenyl) glycidate

To a cooled solution of 0.055 mole of 3-chloro-4-cyclohexylacetophenone and 0.055 mole of ethylchloroacetate is added dropwise with stirring over a period of 1.5 hours a warmed solution of 0.055 mole of potassium dissolved in 50 ml. of dry t-butanol. After the addition is completed, the reaction mixture is stirred for an additional 1.5 hours at approximately 15° C. The reaction mixture is then concentrated in vacuo, and the residue obtained is partitioned between 50 ml. of ether and 50 ml. of water. The basic aqueous phase is then separated and extracted further with ether (2× 50 ml.). The combined ether extracts are washed with saturated sodium chloride solution (3× 50 ml.), clarified with 1.3 grams of charcoal, dried over magnesium sulfate and concentrated in vacuo to yield ethyl-β-methyl-β-(3-chloro-4-cyclohexyphenyl) glycidate.

U.V. in methanol

| λ: | E percent |
| --- | --- |
| 2900 | 11.5 |
| 2760 | 22.2 |
| 2510 | 59.4 |

Similarly, when methyl-α-chloropropionate is used in place of ethylchloroacetate in the above example, there is obtained methyl-α,β-dimethyl-β-(3-chloro-4-cyclohexylphenyl) glycidate.

EXAMPLE 17

Sodium-β-methyl-β-(3-chloro-4-cyclohexylphenyl) glycidate

To a cooled solution of 0.0465 mole of sodium methylate in 10 ml. of ethanol is added a solution of 0.0465 mole of ethyl-β-methyl-β-(3-chloro-4-cyclohexyphenyl) glycidate in 15 ml. of ethanol dropwise over a period of 15 minutes. After the ester has been added, the solution is cooled to approximately 10° C. and 1 gram of water is added dropwise over a period of 5 minutes. The reaction mixture is then stirred for an additional 30 minutes at 15° C. and concentrated in vacuo. To the residue thus obtained is added 20 ml. of ether. The mixture is then vigorously stirred while adding an additional 30 ml. of ether. The ether is then decanted and the residual solid dried to yield sodium-β-methyl-β-(3-chloro-4-cyclohexylphenyl) glycidate.

Similarly, when methyl - α,β - dimethyl-β-(3-chloro-4-cyclohexylphenyl) glycidate obtained from Example 16 is used in place of ethyl-β-methyl-β-(3-chloro-4-cyclohexylphenyl) glycidate in the above example, there is obtained sodium - α,β - dimethyl - β-(3-chloro-4-cyclohexylphenyl) glycidate, M.P. 282–284.5 dec.

EXAMPLE 18 dl-α-Methyl-(3-chloro-4-cyclohexylphenyl) acetaldehyde

A mixture of 0.0379 mole of sodium-β-methyl-β-(3-chloro-4-cyclohexylphenyl) glycidate and 50 ml. of 25% aqueous acetic acid is stirred on a steam bath for 3 hours. The reaction mixture is then diluted with 50 ml. of water, cooled to room temperature and extracted with ether (2× 25 ml.). The combined ether extracts are then washed with saturated aqueous sodium bicarbonate (4× 25 ml.), with water (3× 25 ml.), charcoaled, dried over magnesium sulfate and filtered. The filtrate is then concentrated in vacuo to yield dl-α-methyl-(3-chloro-4-cyclohexylphenyl) acetaldehyde.

U.V. in methanol

| λ: | E percent |
| --- | --- |
| 2900 | 13.1 |
| 2770 | 31.5 |
| 2680 | 38.1 |
| 2600 | 42.0 |

Similarly, when sodium - α,β - dimethyl-β-(3-chloro-4-cyclohexylphenyl) glycidate obtained from Example 17 is used in place of sodium - β - methyl-β-(3-chloro-4-cyclohexylphenyl) glycidate in the above example, there is obtained 3-(3'-chloro-4'-cyclohexylphenyl)-butan-2-one.

U.V. in methanol

| λ: | E percent |
| --- | --- |
| 2775 | 27.0 |
| 2690 | 27.8 |
| 2610 | 27.5 |

EXAMPLE 19

3-chloro-4-cyclohexylbromobenzene

The procedure of Example 9 is followed using equivalent amounts of cyclohexanol and 3-bromochlorobenzene in place of 2-cyclohexylchlorobenzene and α-chloropropionitrile, respectively, to obtain 3-chloro-4-cyclohexylbromobenzene.

When cyclohexene or cyclohexylchloride is used in place of cyclohexanol, there is obtained 3-chloro-4-cyclohexylbromobenzene.

EXAMPLE 20

3-chloro-4-cyclohexylphenyl magnesium bromide

The procedure of Example 15, part A, is followed using an equivalent amount of 3-chloro-4-cyclohexylphenyl bromide in place of dl-α-(3-chloro-4-cyclohexylphenyl) ethyl bromide to yield 3-chloro-4-cyclohexylphenyl magnesium bromide.

EXAMPLE 21

1-chloro-2-(3'-chloro-4'-cyclohexylphenyl) propan-2-ol

To a cooled solution of 103 g. of 3-chloro-4-cyclohexylphenyl magnesium bromide in 250 ml. of dry ether is added slowly with stirring 40 g. of monochloroacetone and the reaction mixture is stirred overnight. 100 g. of ice are added to the reaction mixture followed by 100 ml. of 30% acetic acid and the mixture stirred. The ethereal layer is then separated, washed with saturated potassium carbonate solution, dried over potassium carbonate and concentrated in vacuo to yield 1-chloro-2-(3'-chloro-4'-cyclohexylphenyl) propan-2-ol.

EXAMPLE 22

3-chloro-4-cyclohexylphenacyl chloride

To a stirred solution of 0.10 mole of 3-chloro-4-cyclohexylacetophenone in 100 ml. of carbon tetrachloride is added dropwise 0.10 mole of ethyl hypochlorite, with external cooling. When the addition is completed, the reaction mixture is aged briefly, then the solvent removed under reduced pressure to leave 3-chloro-4-cyclohexylphenacyl chloride.

The above compound may also be prepared according to the procedure of Example 1, part A using 0.2 mole of aluminum chloride instead of 0.1 mole and equivalent amounts of 2-cyclohexylchlorobenzene and chloroacetyl chloride in place of cyclohexylbenzene and acetyl chloride, respectively. Or it may be prepared from cyclohexylbenzene according to the procedure of Example 1, parts A and B.

EXAMPLE 23 dl-α-Methyl-α-(3-chloro-4-cyclohexylphenyl)-β-chloroethanol

To a solution of 0.1 mole of methyl magnesium bromide in 250 ml. of ether is added dropwise 0.1 mole of 3-chloro-4-cyclohexylphenacyl chloride in 250 ml. of ether, and the reaction mixture stirred at room temperature for 1 hour. The reaction mixture is then poured into a stirred mixture of 100 g. ice and 100 ml. dilute hydrochloric acid. The organic phase containing the product is separated, washed well with water (3× 100 ml.), dried over sodium sulfate, filtered, and the solvent removed under reduced pressure to yield dl-α-methyl-α-(3-chloro-4-cyclohexylphenyl)-β-chloroethanol.

EXAMPLE 24

2-(3'-chloro-4'-cyclohexylphenyl) propylene oxide

To a solution of 0.2 mole of sodium exthoxide in 100 ml. of ethanol is added 0.2 mole of dl-α-methyl-α-(3-chloro-4-cyclohexylphenyl)-β-chloroethanol and the reaction mixture refluxed for 2 hours. The mixture is then filtered and the filtrate concentrated in vacuo to yield 2-(3'-chloro-4'-cyclohexylphenyl) propylene oxide.

EXAMPLE 25 dl-α-Methyl-(3-chloro-4-cyclohexylphenyl) acetaldehyde

A mixture of 0.1 mole of 2-(3'-chloro-4'-cyclohexylphenyl) propylene oxide and 250 ml. of 1.0 N aqueous hydrochloric acid is heated in a bomb at 180° C. for 6 hours. The product is then removed by extraction with ether (2× 50 ml.). The combined ether extracts are washed with dilute sodium bicarbonate solution (1× 100 ml.), with water (2× 100 ml.), dried over magnesium sulfate, and filtered. The solvent is removed under reduced pressure to afford α-methyl-(3-chloro-4-cyclohexylphenyl) acetaldehyde.

EXAMPLE 26 dl-α-Methyl-(3-chloro-4-cyclohexylphenyl acetaldehyde

To a freshly prepared solution of 0.2 mole of methoxymethylenetriphenylphosphorane in 250 ml. of ether is added with stirring 0.1 mole of 3-chloro-4-cyclohexylacetophenone in 150 ml. of ether and the reaction mixture stirred for 1 hour. At this point 100 ml. of ether previously saturated with 72% perchloric acid is added dropwise with stirring to hydrolyze the enol ether. After addition the mixture is stirred for an additional 15 minutes, then treated with 100 ml. of water, the ether phase separated, washed with aqueous saturated sodium bicarbonate solution (1× 100 ml.), with water (2× 100 ml.), dried over magnesium sulfate, filtered and the filtrate concentrated to give dl-α-methyl-(3-chloro-4-cyclohexylphenyl) acetaldehyde.

EXAMPLE 27 dl-α-Methyl-(3-chloro-4-cyclohexylphenyl) acetic acid

To a stirred mixture of 0.003 mole of 3-(3'-chloro-4'-cyclohexylphenyl)-butan-2-one and 1 ml. of water is added dropwise a cooled solution of excess dilute sodium hypochlorite. The reaction mixture is then slowly heated over a period of 5 hours to 80° C. The mixture is then cooled and partitioned between 10 ml. of ether and 10 ml. of water, and the aqueous phase is separated and extracted further with ether (2× 10 ml.), then acidified with concentrated hydrochloric acid. The product is removed by extraction with petroleum ether (3× 10 ml.). The combined organic extracts are washed with water (3× 30 ml.), dried oved magnesium sulfate, filtered, and the filtrate concentrated in vacuo to give dl-α-methyl-(3-chloro-4-cyclohexylphenyl) acetic acid.

EXAMPLE 28 dl-α-Methyl-(3-chloro-4-cyclohexylphenyl) acetic acid

To a stirred solution of 0.021 mole of dl-α-methyl-(3-chloro-4-cyclohexylphenyl) acetaldehyde in 1 ml. of glacial acetic acid cooled to 3° C. is added 0.012 mole of sodium nitrite. To this reaction mixture maintained at 0° C. is then added dropwise, 3.24 ml. of 70% nitric acid, over a period of 1 hour. The mixture is then stirred for an additional 4 hours at 0° C., after which time the reaction mixture is allowed to warm to room temperature. It is then treated with 25 ml. of saturated aqueous sodium chloride solution. The product is extracted with ether (3× 15 ml.), and the combined ether extracts are treated with 1 N KOH, the basic phase extracted again with 15 ml. ether to remove unreacted starting material, then acidified with concentrated hydrochloric acid. The carboxylic acid is then removed by extraction with petroleum ether (2× 15 ml.), the organic extracts combined and washed with water (3× 30 ml.), dried over magnesium sulfate, filtered and the filtrate concentrated in vacuo to yield dl-α-methyl-(3-chloro-4-cyclohexylphenyl) acetic acid.

EXAMPLE 29

3-chloro-4-cyclohexylphenylacetic acid

A stirred mixture of 0.10 mole of 3-chloro-4-cyclohexylacetophenone, 0.16 mole of sulfur and 31 ml. of morpholine is refluxed for 15 hours. The reaction mixture is then poured onto ice and extracted with ether. The ether extract is then concentrated in vacuo and to the concentrate is added 300 ml. of potassium hydroxide and this mixture is refluxed for 15 hours. The reaction mixture is then extracted with ether and the basic aqueous phase acidified with concentrated hydrochloric acid to liberate the crude 3-chloro-4-cyclohexylphenylacetic acid. The product is then purified by crystallization from hexane.

When 3-bromo-4-cyclohexylacetophenone is used in place of 3-chloro-4-cyclohexylacetophenone in the above example, there is obtained 3-bromo-4-cyclohexylphenylacetic acid.

EXAMPLE 30

Ethyl-3-chloro-4-cyclohexylphenyl acetate

A solution of 0.10 mole of 3-chloro-4-cyclohexylphenylacetic acid in 100 ml. of ethanol containing 3 ml. of concentrated sulfuric acid is refluxed for 3 hours. The reaction mixture is then concentrated in vacuo to a small volume, whereupon 200 ml. of water is added and the product extracted with ether. The ether extract is then washed with dilute aqueous bicarbonate, followed by water washing. The ether phase is then dried over magnesium sulfate and concentrated in vacuo to yield ethyl-3-chloro-4-cyclohexylphenyl acetate.

When 3-bromo-4-cyclohexylphenylacetic acid obtained from Example 30 is used in place of 3-chloro-4-cyclohexylphenylacetic acid, there is obtained the corresponding ethyl-3-bromo-4-cyclohexylphenyl acetate.

EXAMPLE 31 dl-Ethyl-α-methyl-(3-chloro-4-cyclohexylphenyl) acetate

To a stirred suspension of 0.20 mole of sodamide in 500 ml. of anhydrous liquid ammonia is added a solution of 0.2 mole of ethyl-3-chloro-4-cyclohexylphenyl acetate in 50 ml. of dry ether. After 15 minutes a solution of 0.2 mole of methyl iodine in 50 ml. of dry ether is added with stirring. After stirring for 2 hours under an acetone-dry ice condenser, 0.25 mole of ammonium chloride is added and the ammonia is evaporated on a steam bath. The resulting ethereal suspension is cooled, acidified with dilute hydrochloric acid and the layers separated. The ether phase is then washed with sodium bicarbonate solution, followed by a wash of saturated aqueous sodium chloride, then dried over magnesium sulfate and concentrated in vacuo to yield dl-ethyl-α-methyl-(3-chloro-4-cyclohexylphenyl) acetate.

When ethyl-(3-bromo-4-cyclohexylphenyl) acetate obtained from Example 30 is used in place of ethyl-3-chloro-4-cyclohexylphenyl acetate, there is obtained dl-ethyl-α-methyl-(3-bromo-4-cyclohexylphenyl) acetate.

Similarly, when an equivalent amount of 3-chloro-4-cyclohexylphenylacetic acid is used in place of the ester above and 0.4 mole of sodamide is used in place of 0.2 mole of sodamite above and the acidified ether phase obtained in the above example then washed with water, dried over magnesium sulfate and concentrated in vacuo, there is obtained dl-α-methyl-(3-chloro-4-cyclohexylphenyl) acetic acid.

Similarly, when ethyl iodide and propyl iodide are used in place of methyl iodide in the above example, there are obtained the corresponding ethyl and propyl acetate compounds.

EXAMPLE 32 dl-α-Methyl-(3-chloro-4-cyclohexylphenyl) acetic acid

A solution of 0.1 mole of dl-ethyl-α-methyl-(3-chloro-4-cyclohexylphenyl) acetate and 1.0 mole of potassium hydroxide in 250 ml. of 95% ethanol is refluxed for 19 hours. The reaction mixture is then concentrated under reduced pressure and the residue dissolved in a small amount of water. The basic aqueous solution is then extracted with ether and acidified with concentrated hydrochloric acid. The acidified mixture is then extracted with petroleum ether (2×15 ml.) and the combined organic extracts washed with water (2×50 ml.), dried over magnesium sulfate and concentrated in vacuo to yield dl-α-methyl-(3-chloro-4-cyclohexylphenyl) acetic acid.

When dl-ethyl-α-methyl-(3-bromo-4-cyclohexylphenyl) acetate is used in place of dl-ethyl-α-methyl-(3-chloro-4-cyclohexylphenyl) acetate in the above example, there is obtained the corresponding dl - α - methyl-(3-bromo-4-cyclohexylphenyl) acetic acid.

EXAMPLE 33

Ethyl-α-(3-chloro-4-cyclohexylphenyl) malonate

A mixture of 0.297 mole of ethyl-(3-chloro-4-cyclohexylphenyl) acetate, 300 ml. of diethylcarbonate and dry sodium ethoxide (obtained from 7.5 g. of sodium) are heated and stirred in a flask equipped with a fractionating column having a variable take off. The alcohol formed in the reaction is removed continuously at first at 200 mm.; and as the condensation proceeds, the distillation of the alcohol is completed at atmospheric pressure. When no more alcohol distills over, the reaction mixture is cooled, acidified with acetic acid and the product partitioned between 100 ml. ether and 100 ml. $H_2O$. The nonaqueous layer is separated, washed with sodium carbonate solution (1×100 ml.), water (2×100 ml.), then dried over magnesium sulfate and concentrated in vacuo to yield ethyl-α-(3-chloro-4-cyclohexylphenyl) malonate.

EXAMPLE 34

Ethyl-α-methyl-α-(3-chloro-4-cyclohexylphenyl) malonate

A solution of 2.3 g. of sodium in 25 ml. of absolute alcohol is mixed with 0.10 mole of ethyl-α-(3-chloro-4-cyclohexylphenyl) malonate and 0.12 mole of methyl iodide. The mixture is then refluxed until it is neutral to moist litmus paper. The greater portion of the alcohol is then distilled off and the residue treated with water and the ester taken up in ether. The ethereal solution is then washed with water, dried over calcium chloride and concentrated in vacuo to yield ethyl-α-methyl-α-(3-chloro-4-cyclohexylphenyl) malonate.

EXAMPLE 35 dl-α-methyl-α-(3-chloro-4-cyclohexylphenyl) acetic acid

The procedure of Example 32 is followed to effect simultaneous hydrolysis and decarboxylation using an equivalent amount of ethyl-α-methyl-α-(3-chloro-4-cyclohexylphenyl) malonate in place of ethyl-α-methyl-(3-chloro-4-cyclohexylphenyl) acetate to form dl-α-methyl-α-(3-chloro-4-cyclohexylphenyl) acetic acid.

EXAMPLE 36

α-Methyl-(3-chloro-4-cyclohexylphenyl) acetic acid

A. α-METHYL-α-(3-CHLORO-4-CYCLOHEXYLPHENYL) MALONIC ACID

A stirred mixture of 0.1 mole of ethyl-α-methyl-α-(3-chloro-4-cyclohexylphenyl) malonate, 0.5 mole of sodium hydroxide, 50 ml. of water and 100 ml. of 95% ethanol is heated at reflux. After a short time, the sodium salt of the product begins to precipitate out. After 1–2 hours at reflux, the mixture is cooled, the sodium salt filtered, washed with ethanol (2×10 ml.), then dissolved in warm water and acidified with dilute hydrochloric acid to give α-methyl-α-(3-chloro-4-cyclohexylphenyl) malonic acid.

B.—0.07 mole of α-methyl-α-(3-chloro-4-cyclohexylphenyl) malonic acid obtained from Part A above is heated in an oil bath to about 220° and kept at that temperature until evolution of carbon dioxide ceases. After cooling to room temperature, the product is purified by recrystallization from petroleum ether.

EXAMPLE 37

Ethyl-(3-chloro-4-cyclohexylphenyl) glyoxalate

The procedure of Example 1, part A, is followed using 0.2 mole of aluminum chloride instead of 0.1 mole of aluminum chloride and equivalent amounts of ethyl oxalyl chloride and 2-cyclohexylchlorobenzene in place of acetyl chloride and cyclohexylbenzene, respectively, to form ethyl-(3-chloro-4-cyclohexylphenyl) glyoxalate.

EXAMPLE 38 dl-Ethyl-α-hydroxy-α-methyl-(3-chloro-4-cyclohexylphenyl) acetate

The procedure of Example 20 is followed using equivalent amounts of methyl magnesium bromide and ethyl-(3-chloro - 4 - cyclohexylphenyl) glyoxalate in place of 3-chloro-4-cyclohexylphenyl magnesium bromide and monochloroacetone, respectively, to obtain dl-ethyl - α - hydroxy-α-methyl-(3-chloro-4-cyclohexylphenyl) acetate.

Similarly, when Example 20 is followed using an equivalent amount of ethylpyruvate in place of monochloroacetone, there is obtained dl-ethyl-α-hydroxy-α-methyl-(3-chloro-4-cyclohexylphenyl) acetate.

EXAMPLE 39 dl-α-Methyl-α-hydroxy-(3-chloro-4-cyclohexylphenyl) acetic acid

The procedure of Example 32 is followed using an equivalent amount of dl-ethyl-α-hydroxy - α - methyl-(3-chloro-4-cyclohexylphenyl) acetate in place of dl-ethyl-α-methyl-(3-chloro-4-cyclohexylphenyl) acetate to obtain dl-α-methyl - α - hydroxy-(3-chloro-4-cyclohexylphenyl) acetic acid.

EXAMPLE 40 dl-α-Methyl-α-methoxy-(3-chloro-4-cyclohexylphenyl) acetic acid

To a stirred mixture of 0.5 mole 3-chloro - 4 - cyclohexylacetophenone, 0.75 mole of chloroform and 100 ml. of methanol, is added dropwise over a period of 3 hours; a solution of 2.5 moles of potassium hydroxide in 400 ml. of methanol. The reaction temperature is maintained at 45° during the addition, and for 1 hour afterwards. The reaction mixture is then allowed to stand overnight. After this aging period, the reaction mixture is filtered and the filter cake washed well with water (3× 50 ml.). The combined filtrates are concentrated under reduced pressure to a moist solid which is triturated with acetone (2× 10 ml.), then dissolved in warm water and acidified with an excess of 25% sulfuric acid. The mixture is extracted with ether (3× 50 ml.), the ether washed with water (2× 100 ml.), stirred with charcoal and magnesium sulfate, filtered and concentrated in vacuo to yield dl-α-methoxy-α-methyl-(3-chloro-4 - cyclohexylphenyl) acetic acid.

Similarly, when water is used in place of methanol in the above example, dl-α-methyl-α-hydroxy-(3-chloro-4-cyclohexylphenyl) acetic acid is obtained.

EXAMPLE 41 dl-α-Methyl-(3-chloro-4-cyclohexylphenyl) acetic acid

A mixture of 0.052 mole of dl-α-methoxy-α-methyl-(3-chloro-4-cyclohexylphenyl) acetic acid and 6 g. of freshly prepared Raney nickel is heated in 25 ml. of refluxing ethanol for 0.5 hour. The reaction mixture is then filtered and the catalyst washed with a small portion of ethanol, the combined filtrate then concentrated in vacuo to yield dl-α-methyl-(3-chloro - 4 - cyclohexylphenyl) acetic acid.

Similarly, when an equavilent quantity of dl-α-hydroxy-α-methyl-(3-chloro - 4 - cyclohexylphenyl) acetic acid is used in place of dl-α-methoxy-α-methyl-(3-chloro-4-cyclohexylphenyl) acetic acid in the above example, there is obtained dl-α-methyl-(3-chloro - 4 - cyclohexylphenyl) acetic acid.

EXAMPLE 42

α-Methylene-(3-chloro-4-cyclohexylphenyl) acetic acid

A solution of 5.0 g. of dl-α-hydroxy - α - methyl-(3-chloro-4-cyclohexylphenyl) acetic acid and 2.0 g. of p-toluenesulfonic acid in 100 ml. toluene is refluxed for 3 hours, the water formed in the reaction being removed via a Dean-Stark trap. The reaction mixture is cooled, 50 ml. ether added, the resulting solution is washed well with water, dried over sodium sulfate, and concentrated in vacuo. The residue thus obtained is crystallized from hexane to yield 4.1 g. of α-methylene-(3-chloro-4-cyclohexylphenyl) acetic acid, M.P. 129–131° C.

EXAMPLE 43 dl-α-Methyl-(3-chloro-4-cyclohexylphenyl) acetic acid

A solution of 2.33 g. of α-methylene-(3-chloro-4-cyclohexylphenyl) acetic acid in 25 ml. of ethanol containing 0.1 g. platinum oxide is shaken with hydrogen at room temperature. After the required amount of hydrogen has been taken up, the reaction mixture is filtered and concentrated to an oil which solidifies upon the addition of petroleum ether. Recrystallization from hexane gives 1.4 g. of dl-α-methyl-(3-chloro - 4 - cyclohexylphenyl) acetic acid, M.P. 84–85.5° C.

EXAMPLE 44 dl-α-Methyl-(3-chloro-4-cyclohexylphenyl) acetic acid

To a solution of 1.8 g. of dl-α-hydroxy - α - methyl-(3-chloro-4-cyclohexylphenyl) acetic acid in 40 ml. of glacial acetic acid is added 0.79 g. of phosphorous and 0.32 g. of iodine. The stirred mixture is then refluxed for 16 hours, filtered while hot, and the filtrate poured into 150 ml. of ice water. The mixture is then filtered and the cake thus obtained dissolved in chloroform, washed with water, dried over magnesium sulfate, charcoaled, and the solvent removed in vacuo. The residual acid is esterified by refluxing with 15 ml. of methanol and 0.15 ml. of sulfuric acid for 3 hours. The solution is then diluted with ether and the reaction mixture washed free of sulfuric acid (with water), dried over magnesium sulfate, and concentrated in vacuo. The methyl ester thus obtained is chromatographed on 75 g. of silica gel using a benzene-petroleum ether system. Two compounds are obtained, which are later saponified separately. The larger fraction is dissolved in 20 ml. of 95% ethanol to which 0.7 g. of potassium hydroxide in 3 ml. of water is added. The mixture is then refluxed for 5 hours, diluted with water, and most of the methanol removed in vacuo. At this point, the solution is acidified with cold 6 N hydrochloric acid. The desired dl-α-methyl-(3-chloro - 4 - cyclohexylphenyl) acetic acid is obtained by filtration or extraction from the acidic mixture and recrystallization from ice-cold hexane. The second product obtained during the phosphorus iodine reduction and subsequently isolated as the methyl ester is the unsaturated analogue, α-methylene-(3-chloro-4-cyclohexylphenyl) acetic acid, M.P. 129–131° C.

EXAMPLE 45 dl-Ethyl-α-methyl-(3-chloro-4-cyclohexylphenyl) acetate

To a stirred solution of 0.10 mole of t-butyl α-bromopropionate in 20 ml. of anhydrous ether is added dropwise an ethereal solution of 0.10 mole of freshly prepared 3-chloro-4-cyclohexylphenyl magnesium bromide. The addition is carried out under $N_2$ over a period of 0.5 hours, with the exclusion of moisture. When the addition is complete, the reaction mixture is aged with stirring for several hours longer. Water (100 ml.) is then added, the layers separated, the ether phase is washed further with water (2×100 ml.), dried over magnesium sulfate, filtered and the filtrate concentrated in vacuo to afford dl-t-btuyl-α-methyl-(3-chloro-4-cyclohexylphenyl) acetate.

EXAMPLE 46

3-chloro-4-cyclohexylbenzoic acid

The procedure of Example 15, part B, is followed using an equivalent amount of 3-chloro-4-cyclohexylphenyl magnesium bromide in place of α-(3-chloro-4-cyclohexylphenyl) ethyl magnesium bromide to form 3-chloro-4-cyclohexylbenzoic acid.

EXAMPLE 47

3-chloro-4-cyclohexylbenzoic acid

The procedure of Example 27 is followed using an equivalent amount of 3-chloro-4-cyclohexylacetophenone in place of 3-(3′-chloro-4′-cyclohexylphenyl) butan-2-one to form 3-chloro-4-cyclohexylbenzoic acid.

EXAMPLE 48

3-chloro-4-cyclohexylbenzoyl chloride

A stirred mixture of 0.17 mole of 3-chloro-4-cyclohexylbenzoic acid and 30 ml. of thionyl chloride is heated at 100° C. until the evolution of hydrogen chloride and sulfur dioxide ceases. The reaction mixture is then concentrated to remove the excess thionyl chloride to form a crude 3-chloro-4-cyclohexylbenzoyl chloride.

EXAMPLE 49

3-chloro-4-cyclohexyl-α-diazo-propiophenone

To a dried (over potassium hydroxide) solution of 0.13 mole of diazoethane in 100 ml. of ether, cooled to −15°, is added 0.12 mole of triethylamine. A solution of 0.10 mole of 3-chloro-4-cyclohexylbenzoyl chloride in 100 ml. of ether is then added dropwise, with stirring over a 30 minute period. After the reaction mixture is stirred for an additional hour at −15°, the precipitated salt is filtered, washed well with ether (2×10 ml.) and the combined filtrates concentrated in vacuo, initially at −15°, then at 0°, to a small volume, the mixture is then filtered and the cake washed with petroleum ether to yield 3-chloro-4-cyclohexyl-α-diazo-propiophenone.

EXAMPLE 50 dl-α-Methyl-(3-chloro-4-cyclohexylphenyl) acetic acid

A. BENZYL-(3-CHLORO-4-CYCLOHEXYLPHENYL) ACETATE

To a stirred mixture of 50 ml. of freshly distilled benzyl alcohol and dimethylaniline heated to about 180° is added 0.07 mole of 3-chloro-4-cyclohexyl-α-diazo-propiophenone in small portions. When the addition is complete, and the evolution of nitrogen has ceased, the reaction mixture is cooled, 200 ml. of ether is added and the solution is then washed with dilute hydrochloric acid (3× 150 ml.), followed by water washing (2× 150 ml.). The organic phase is then stirred with charcoal and magnesium sulfate, filtered, and concentrated in vacuo to afford the benzyl ester of dl-α-methyl-(3-chloro-4-cyclohexylphenyl) acetic acid.

B. dl-α-METHYL-(3-CHLORO-4-CYCLOHEXYLPHENYL) ACETIC ACID

The procedure of Example 32 is followed using an equivalent quantity of benzyl - (3-chloro-4-cyclohexylphenyl) acetate in place of ethyl-α-methyl-(3-chloro-4-cyclohexylphenyl) acetate; there is obtained dl-α-methyl-(3-chloro-4-cyclohexylphenyl) acetic acid.

EXAMPLE 51 d-α-Methyl-3-chloro-4-cyclohexylphenyl acetic acid

To a solution of 12.67 grams (0.042 mole) of cinchonidine in hot chloroform is added a solution of 20.9 grams of dl-α-methyl-3-chloro-4-cyclohexylphenyl acetic acid (0.0783 mole) (55% of base) in 100 cc. chloroform. An exothermic reaction takes place. After 30 minutes, the solution is concentrated in vacuo to remove all chloroform. The resulting oil crystallizes upon the gradual addition of acetone. The salt is then resolved by dissolving it in boiling acetone, distilling the solvent at atmospheric pressure until crystals begin to appear. The solution is allowed to cool to room temperature and the solid material filtered. This procedure is repeated until the M.P. of the salt is constant at 177.7–178.2° C. The $[\alpha]_D$ of the salt is −55.5°+−0.5°. The acid is then recovered by extracting the salt between petroleum ether and 10% hydrochloric acid. Concentration of the petroleum ether layer gives an oil which gradually crystallizes. The acid thus obtained has a $[\alpha]_D^{23.5}$ of +36.5°, M.P. 61.5–62.0° C.

EXAMPLE 52

α-Methyl-(3-chloro-4-cyclohexylphenyl) acetic acid

Cyclohexyl-p-toluenesulfonate (10.2 g.) is heated with stirring at 100 to 120° C. with 6.4 g. of α-methyl-3-chlorophenylacetic acid ethyl ester for 5 hours. The reaction mixture is then cooled to room temperature, dissolved in 150 ml. of benzene and washed with water and sodium bicarbonate solution. After removal of the solvent, the residue is dissolved in 50 ml. ethanol; 20 ml. of 2.5 N sodium hydroxide is added and the reaction mixture refluxed for 3 hours to hydrolyze the ester. The alcohol is then removed in vacuo and the residue is dissolved in in 30 ml. of water. The pH of the solution is adjusted to 1.5–2.0 by dilute hydrochloric acid. The oily precipitate is extracted with ether. After removal of the solvent, the crude product is crystallized from hexane to give α-methyl-(3-chloro-4-cyclohexylphenyl) acetic acid, M.P. 83° C.

What is claimed is:

1. A process for preparing a halophenyl keto compound of the formula

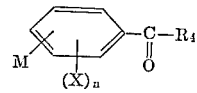

wherein

M is selected from the group consisting of hydrogen, cyclohexyl and lower alkyl, $R_4$ is selected from the group consisting of lower alkyl and benzyl, X is selected from the group consisting of bromo and chloro, and $n$ is a number from one to two, which comprises in combination the steps of (a) admixing a benzene compound of the formula

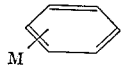

with a compound of the formula

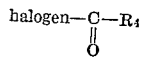

in an inert solvent of the group consisting of hydrocarbons and halohydrocarbons in the presence of a catalyst selected from the group consisting of $AlCl_3$ and $AlBr_3$ to form a phenylketone compound, (b) admixing the reaction mixture from step (a) with and element selected from the group consisting of chlorine and bromine in at least a slight excess of aluminum halide to form a haloaryl alkyl ketone complex, and (c) treating said haloaryl alkyl ketone complex with a compound selected from the group consisting of water and an aqueous acid to form the desired halophenyl keto compound.

References Cited

UNITED STATES PATENTS 3,013,079 12/1961 Pearson et al. _____ 260—592
2,107,905 2/1936 Ralston et al. _____ 260—592

OTHER REFERENCES

Miquel et al.: J. Chem. Soc. (London), 1955, 3417.
Macardle: Use of Solvents in Synthetic Organic Chemistry, p. 3 (1925). Van Nostrand, New York, N.Y.

DANIEL D. HORWITZ, *Primary Examiner.*

U.S. Cl. X.R.

260—592, 618, 651, 599, 348, 611, 515, 475, 473, 520, 544, 469, 141, 650, 465, 65